United States Patent
Bogart et al.

(10) Patent No.: US 12,424,616 B2
(45) Date of Patent: Sep. 23, 2025

(54) ELECTROACTIVE MATERIALS FOR METAL-ION BATTERIES

(71) Applicant: Nexeon Limited, Oxfordshire (GB)

(72) Inventors: Timothy Bogart, Oxfordshire (GB); Simon Foxon, Oxfordshire (GB); James Farrell, Oxfordshire (GB); David Bent, Oxfordshire (GB); Daniel Scarlett, Oxfordshire (GB)

(73) Assignee: Nexeon Limited, Oxfordshire (GB)

( * ) Notice: Subject to any disclaimer, the term of this patent is extended or adjusted under 35 U.S.C. 154(b) by 0 days.

(21) Appl. No.: 18/759,452

(22) Filed: Jun. 28, 2024

(65) Prior Publication Data

US 2024/0372071 A1 Nov. 7, 2024

Related U.S. Application Data

(63) Continuation of application No. 18/205,033, filed on Jun. 2, 2023, now Pat. No. 12,062,776, which is a continuation of application No. 16/619,064, filed as application No. PCT/GB2018/051689 on Jun. 18, 2018, now Pat. No. 11,710,819.

(30) Foreign Application Priority Data

Jun. 16, 2017 (GB) .................................. 1709685

(51) Int. Cl.
| | |
|---|---|
| H01M 4/36 | (2006.01) |
| C01B 33/02 | (2006.01) |
| C04B 35/532 | (2006.01) |
| C04B 35/626 | (2006.01) |
| C04B 35/628 | (2006.01) |
| C04B 35/64 | (2006.01) |
| H01M 4/38 | (2006.01) |
| H01M 4/62 | (2006.01) |
| H01M 4/02 | (2006.01) |

(52) U.S. Cl.
CPC .............. *H01M 4/362* (2013.01); *C01B 33/02* (2013.01); *C04B 35/532* (2013.01); *C04B 35/6261* (2013.01); *C04B 35/6264* (2013.01); *C04B 35/62839* (2013.01); *C04B 35/64* (2013.01); *H01M 4/386* (2013.01); *H01M 4/625* (2013.01); *C01P 2004/51* (2013.01); *C01P 2004/62* (2013.01); *C01P 2004/64* (2013.01); *C01P 2006/12* (2013.01); *C01P 2006/40* (2013.01); *C04B 2235/422* (2013.01); *C04B 2235/428* (2013.01); *C04B 2235/5445* (2013.01); *C04B 2235/5454* (2013.01); *H01M 2004/027* (2013.01)

(58) Field of Classification Search
CPC ....... H01M 4/362; H01M 4/625; C01B 33/02; C04B 35/62839
See application file for complete search history.

(56) References Cited

U.S. PATENT DOCUMENTS

| | | |
|---|---|---|
| 6,334,939 B1 | 1/2002 | Zhou et al. |
| 6,514,395 B2 | 2/2003 | Zhou et al. |
| 7,883,995 B2 | 2/2011 | Mitchell et al. |
| 8,526,166 B2 | 9/2013 | Choi et al. |
| 9,461,304 B2 | 10/2016 | Newbound et al. |
| 9,548,489 B2 | 1/2017 | Abdelsalam et al. |
| 9,859,552 B2 | 1/2018 | Fukasawa et al. |
| 10,008,716 B2 | 6/2018 | Abdelsalam et al. |
| 10,077,506 B2 | 9/2018 | Friend et al. |
| 10,090,513 B2 | 10/2018 | Canham et al. |
| 10,103,379 B2 | 10/2018 | Macklin et al. |
| 10,164,257 B2 | 12/2018 | Otsuka et al. |
| 10,388,948 B2 | 8/2019 | Abdelsalam et al. |
| 10,396,355 B2 | 8/2019 | Cho et al. |
| 10,586,976 B2 | 3/2020 | Cho et al. |
| 10,673,072 B2 | 6/2020 | Cho et al. |
| 10,693,134 B2 | 6/2020 | Cho et al. |
| 10,797,303 B2 | 10/2020 | Cho et al. |
| 10,797,312 B2 | 10/2020 | Cho et al. |
| 10,822,713 B2 | 11/2020 | Friend et al. |
| 11,171,332 B2 | 11/2021 | Park et al. |
| 11,196,042 B2 | 12/2021 | Cho et al. |
| 11,710,819 B2 | 7/2023 | Bogart et al. |
| 2001/0044045 A1 | 11/2001 | Sato et al. |
| 2002/0086211 A1 | 7/2002 | Umeno et al. |

(Continued)

FOREIGN PATENT DOCUMENTS

| | | |
|---|---|---|
| CN | 106384825 A | 2/2017 |
| EP | 2919298 A1 | 9/2015 |

(Continued)

OTHER PUBLICATIONS

Hess, D.W., Thermal oxidation of silicon, Chemical Engineering Education, 4 pages, (1990).
International Search Report, PCT/GB2018/051689 (Electroactive Materials for Metal-Ion Batteries, filed Jun. 18, 2018), issued by ISA/European Patent Office, 4 pages, Sep. 19, 2018.
Nishihara, H. et al., Fabrication of a Highly Conductive Ordered Porous Electrode by Carbon-Coating of a Continuous Mesoporous Silica Film, Chem. Mater, 23:3144-3151, (2011).
Ohara, S. et al., A thin film silicon anode for Li-ion batteries having a very large specific capacity and long cycle life, Journal of Power Sources, (136):303-306 (2004).

(Continued)

*Primary Examiner* — Khanh T Nguyen
(74) *Attorney, Agent, or Firm* — Choate, Hall & Stewart LLP; William R. Haulbrook; Michael D. Schmitt

(57) ABSTRACT

This invention relates to particulate electroactive materials consisting of a plurality of composite particles, wherein the composite particles comprise a plurality of silicon nanoparticles dispersed within a conductive carbon matrix. The particulate material comprises 40 to 65 wt % silicon, at least 6 wt % and less than 20% oxygen, and has a weight ratio of the total amount of oxygen and nitrogen to silicon in the range of from 0.1 to 0.45 and a weight ratio of carbon to silicon in the range of from 0.1 to 1. The particulate electroactive materials are useful as an active component of an anode in a metal ion battery.

25 Claims, 1 Drawing Sheet

(56) References Cited

U.S. PATENT DOCUMENTS

| | | |
|---|---|---|
| 2003/0150378 A1 | 8/2003 | Winterton et al. |
| 2003/0215711 A1 | 11/2003 | Aramata et al. |
| 2004/0052867 A1 | 3/2004 | Canham |
| 2004/0166319 A1 | 8/2004 | Li et al. |
| 2009/0186267 A1 | 7/2009 | Tiegs |
| 2010/0266902 A1 | 10/2010 | Takano et al. |
| 2010/0279172 A1 | 11/2010 | Hwang et al. |
| 2010/0288970 A1 | 11/2010 | Watanabe et al. |
| 2011/0165468 A1 | 7/2011 | Alias et al. |
| 2011/0236493 A1 | 9/2011 | Canham et al. |
| 2011/0256452 A1 | 10/2011 | Cho et al. |
| 2011/0311873 A1 | 12/2011 | Schulz et al. |
| 2013/0040199 A1 | 2/2013 | Yamamura |
| 2013/0157127 A1 | 6/2013 | Hirose et al. |
| 2014/0004426 A1 | 1/2014 | Kerlau et al. |
| 2014/0021415 A1 | 1/2014 | Kang et al. |
| 2014/0050987 A1 | 2/2014 | Park et al. |
| 2014/0246398 A1 | 9/2014 | Zaghib et al. |
| 2014/0272592 A1 | 9/2014 | Thompkins et al. |
| 2014/0302396 A1 | 10/2014 | Lu et al. |
| 2014/0346436 A1 | 11/2014 | Li et al. |
| 2014/0349183 A1 | 11/2014 | Macklin et al. |
| 2014/0349187 A1 | 11/2014 | Hirose et al. |
| 2015/0044571 A1 | 2/2015 | Abdelsalam et al. |
| 2015/0104705 A1 | 4/2015 | Canham et al. |
| 2015/0263342 A1 | 9/2015 | Newbound et al. |
| 2015/0280221 A1 | 10/2015 | Abdelsalam et al. |
| 2015/0380735 A1 | 12/2015 | Tuduki et al. |
| 2016/0126538 A1 | 5/2016 | Hanelt et al. |
| 2016/0172670 A1 | 6/2016 | Friend |
| 2016/0308205 A1 | 10/2016 | Canham et al. |
| 2016/0359162 A1 | 12/2016 | Kim et al. |
| 2017/0033357 A1 | 2/2017 | Cho et al. |
| 2017/0047580 A1 | 2/2017 | Cho et al. |
| 2017/0133674 A1 | 5/2017 | Murphy et al. |
| 2017/0200939 A1 | 7/2017 | Murphy et al. |
| 2017/0214042 A1 | 7/2017 | Cho et al. |
| 2017/0346079 A1 | 11/2017 | Friend et al. |
| 2017/0352883 A1 | 12/2017 | Cho et al. |
| 2018/0034056 A1 | 2/2018 | Cho et al. |
| 2018/0069234 A1 | 3/2018 | Friend et al. |
| 2018/0083263 A1 | 3/2018 | Cho et al. |
| 2019/0119826 A1 | 4/2019 | Friend et al. |
| 2019/0148718 A1 | 5/2019 | Hatazawa et al. |
| 2019/0190020 A1 | 6/2019 | Park et al. |
| 2019/0198869 A1 | 6/2019 | Park et al. |
| 2019/0296340 A1 | 9/2019 | Cho et al. |
| 2019/0326594 A1 | 10/2019 | Cho et al. |

FOREIGN PATENT DOCUMENTS

| | | |
|---|---|---|
| JP | 2013/008585 A | 1/2013 |
| KR | 100 578 871 B1 | 5/2006 |
| KR | 2008-0091883 A | 10/2008 |
| KR | 2012-0120034 A | 11/2012 |
| KR | 2013 0107892 A | 10/2013 |
| KR | 2016-0115270 A | 10/2016 |
| KR | 2016-0144573 A | 12/2016 |
| WO | WO-2005/096414 A2 | 10/2005 |
| WO | WO-2006/097380 A1 | 9/2006 |
| WO | WO-2007/083155 A1 | 7/2007 |
| WO | WO-2007/094641 A1 | 8/2007 |
| WO | WO-2010/128310 A1 | 11/2010 |
| WO | WO-2011/109328 A1 | 9/2011 |
| WO | WO-2012/028857 A1 | 3/2012 |
| WO | WO-2012/028858 A1 | 3/2012 |
| WO | WO-2012/093224 A1 | 7/2012 |
| WO | WO-2012/175998 A1 | 12/2012 |
| WO | WO-2015/157538 A1 | 10/2015 |
| WO | WO-2016/085953 A1 | 6/2016 |
| WO | WO-2016/153322 A1 | 9/2016 |
| WO | WO-2016/174023 A1 | 11/2016 |

OTHER PUBLICATIONS

Ren, W. et al., Preparation of porous silicon/carbon microspheres as high performance anode materials for lithium ion batteries, Journal of Materials Chemistry A: Materials for Energy and Sustainability, 3(11):5859-5865 (2015).

Su, L. et al., Core Double-shell Si@SiO$_2$@C nanocomposites as anode materials for Li-ion batteries, Chemical Communication, 46:2590-2592 (2010).

Wang, Z. et al., Sub-micron silicon/pyrolyzed carbon@natural graphite self-assembly composite anode material for lithium-ion batteries, Chemical Engineering Journal, 313:187-196, (2017).

Winter, M. et al., Insertion Electrode Materials for Rechargeable Lithium Batteries, Adv. Mater. 10(10):725-763 (1988).

Written Opinion, PCT/GB2018/051689, (Electroactive Materials for Metal-Ion Batteries, filed Jun. 18, 2018), issued by ISA/European Patent Office, issued by ISA/European Patent Office, 6 pages, Sep. 19, 2018.

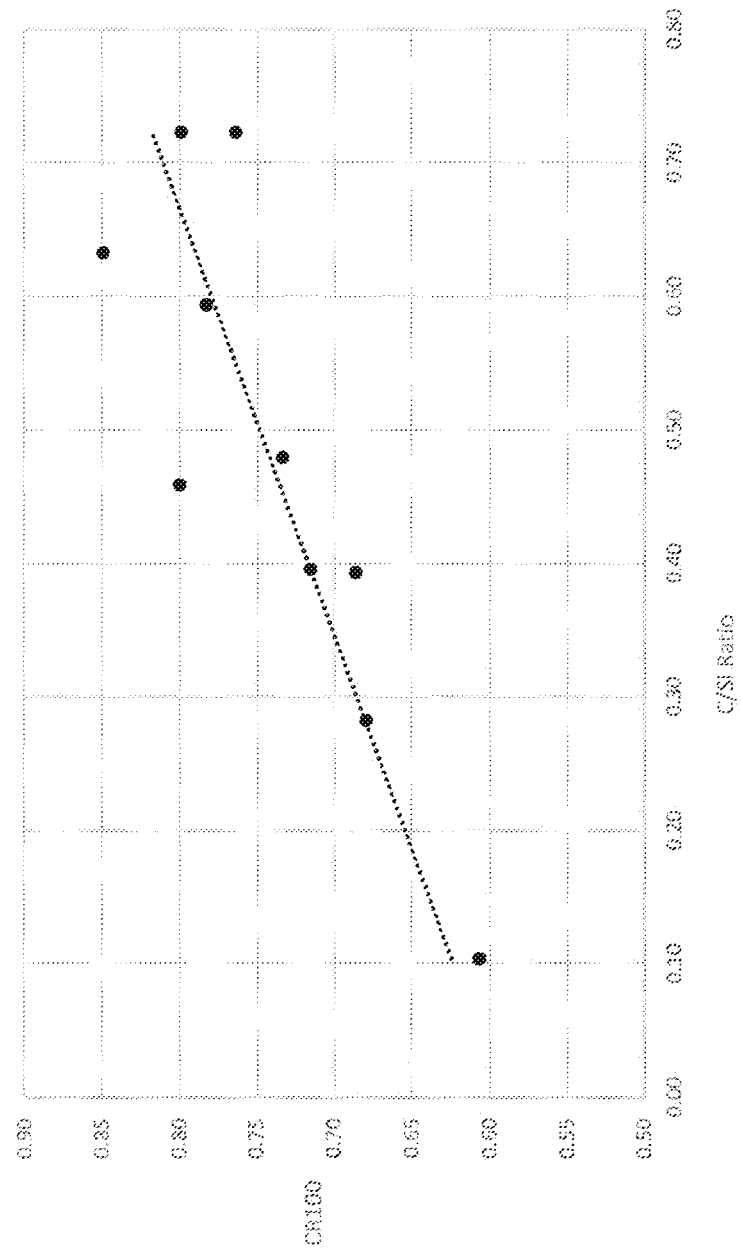

ELECTROACTIVE MATERIALS FOR METAL-ION BATTERIES

This invention relates in general to electroactive materials for use in electrodes for rechargeable metal-ion batteries and more specifically to particulate electroactive materials having high electrochemical capacities that are suitable for use as anode active materials in rechargeable metal-ion batteries. The particulate electroactive materials of the invention have particular utility in hybrid anodes comprising two or more different electroactive materials. Also provided are methods for the preparation of the particulate electroactive materials of the invention.

Rechargeable metal-ion batteries are widely used in portable electronic devices such as mobile telephones and laptops and are finding increasing application in electric or hybrid vehicles. Rechargeable metal-ion batteries generally comprise an anode layer, a cathode layer, an electrolyte to transport metal ions between the anode and cathode layers, and an electrically insulating porous separator disposed between the anode and the cathode. The cathode typically comprises a metal current collector provided with a layer of metal ion containing metal oxide based composite, and the anode typically comprises a metal current collector provided with a layer of an electroactive material, defined herein as a material which is capable of inserting and releasing metal ions during the charging and discharging of a battery. For the avoidance of doubt, the terms "cathode" and "anode" are used herein in the sense that the battery is placed across a load, such that the cathode is the positive electrode and the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. The use of lithium-ion batteries has already provided a substantial improvement when compared to other battery technologies, but there remains scope for further development. To date, commercial lithium-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 340 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$). However, the use of silicon as an anode material is complicated by large volumetric changes on charging and discharging.

Intercalation of lithium into bulk silicon leads to a large increase in the volume of the silicon material, up to 400% of its original volume when silicon is lithiated to its maximum capacity, and repeated charge-discharge cycles cause significant mechanical strain in the silicon material, resulting in fracturing and delamination of the silicon anode material. Volume contraction of silicon particles upon delithiation can result in a loss of electrical contact between the anode material and the current collector. Furthermore, the solid electrolyte interphase (SEI) layer that forms on the silicon surface does not have sufficient mechanical tolerance to accommodate the expansion and contraction of the silicon. As a result, newly exposed silicon surfaces lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. The most widespread approach to address the irreversible capacity loss of silicon-containing anodes is to use nano-structured silicon particles as the electroactive material. It has been reported that silicon nanoparticles and nano-structured silicon is more tolerant of volume changes on charging and discharging when compared to microscale particles. However, nanoscale particles are not particularly suitable for commercial scale applications because they are difficult to prepare and handle. For example, nanoscale particles tend to form agglomerates, making it difficult to obtain a useful dispersion of the particles within an anode material matrix. In addition, the formation of agglomerates of nanoscale particles results in an unacceptable capacity loss on repeated charge-discharge cycling.

Ohara et al. (Journal of Power Sources 136 (2004) 303-306) have described the evaporation of silicon onto a nickel foil current collector as a thin film and the use of this structure as the anode of a lithium-ion battery. Although this approach gives good capacity retention, the thin film structures do not give useful amounts of capacity per unit area, and any improvement is eliminated when the film thickness is increased.

WO 2007/083155 discloses that improved capacity retention may be obtained through the use of silicon particles having high aspect ratio, i.e. the ratio of the largest dimension to the smallest dimension of the particle.

U.S. Pat. Nos. 6,334,939 and 6,514,395 disclose silicon based nanostructures such as cage-like spherical particles comprising void space to provide a buffer zone for the expansion that occurs when lithium is intercalated into silicon.

WO 2012/175998 discloses particles comprising a plurality of silicon-containing pillars extending from a particle core which may be formed, for example, by chemical etching or by a sputtering process.

While it remains a long term objective to produce batteries in which the anode electroactive material is predominantly or entirely silicon, a more immediate goal of battery manufacturers is to identify ways of using small amounts of silicon to supplement the capacity of graphite anodes. A current focus is therefore on obtaining incremental improvements to existing metal-ion battery technology through the use of "hybrid" electrodes in which conventional graphite-based electrodes are modified by the inclusion of small amounts of silicon.

The use of hybrid electrodes presents challenges of its own. Any additional electroactive material must be provided in a form which is compatible with the graphite particulate forms conventionally used in metal-ion batteries. For example, it must be possible to disperse the additional electroactive material throughout a matrix of graphite particles and the particles of the additional electroactive material must have sufficient structural integrity to withstand compounding with graphite particles and subsequent formation of an electrode layer, for example via steps such as compressing, drying and calendering.

U.S. Pat. No. 8,526,166 discloses a lithium ion capacitor that includes a hybrid anode active material comprising two types of active material particles. The first active material particles are selected from active carbon particles, such as graphite particles, and the second active material particles include a silicon oxide and have a particle size of 10 to 100 nm.

WO 2015/157358 discloses anodes for lithium ion batteries in which the anode active material includes graphite and nanoscale particles comprising a mixture of crystalline silicon and $SiO_2$, obtained for instance from the metallothermic reduction of silica. The mixture of crystalline silicon and $SiO_2$ (often referred to as $SiO_x$) may be used in combination with other anode materials, such as carbon-based anode materials.

Despite the efforts to date, there is a continued need for improvements in the electrochemical storage capacity of lithium-ion batteries. In particular, there remains a need to identify alternative silicon-based materials which provide the benefit of the high lithiation capacity of silicon but which also have sufficient capacity retention and structural stability for use in a commercially-viable rechargeable battery.

In a first aspect, the present invention provides a method for preparing a particulate material consisting of a plurality of composite particles that comprise a plurality of silicon nanoparticles dispersed within a conductive pyrolytic carbon matrix, the method comprising the steps of:

(a) milling a silicon starting material in the presence of a non-aqueous solvent to obtain a dispersion of silicon-containing nanoparticles having a $D_{50}$ particle diameter in the range of 30 to 500 nm in the solvent;

(b) contacting the dispersion of silicon nanoparticles in the solvent with a pyrolytic carbon precursor selected from one or more compounds comprising at least one oxygen or nitrogen atom;

(c) removing the solvent to provide silicon nanoparticles coated with the pyrolytic carbon precursor;

(d) optionally heating the coated silicon nanoparticles to a temperature of from 100 to 400° C. for a period of from 5 minutes to 10 hours before step (e); and (e) pyrolysing the coated silicon nanoparticles at a pyrolysis temperature in the range of from 600 to 1200° C. to form said plurality of composite particles that comprise a plurality of silicon nanoparticles dispersed within a conductive pyrolytic carbon matrix.

As used herein, the term "composite particle" shall be understood as referring primarily to a particle comprising a plurality of silicon nanoparticles dispersed within a conductive carbon matrix. However, it is not excluded that there may be a degree of statistical variation in the distribution of the silicon nanoparticles among the particles that constitute the particulate material of the invention. At the extreme of this statistical variation, there may be a minor amount of particles which comprise only a single silicon nanoparticle, or even a minor amount of particles which comprise only the conductive carbon matrix material. References herein to "a particulate material consisting of a plurality of composite particles, wherein the composite particles comprise a plurality of silicon nanoparticles dispersed within a conductive pyrolytic carbon matrix", to "a particulate material" and to "composite particles" shall be understood as encompassing such statistical variation in the composition of individual particles.

The milling of silicon to form nanoparticles results in a significant increase in the surface area of the silicon. Freshly exposed silicon surfaces are highly reactive and ordinarily spontaneously form an oxide layer which degrades electrochemical performance. Without being bound by theory, it is believed that milling the silicon-containing starting material in the presence of a non-aqueous solvent controls oxidation of the silicon surface. Silanol groups at the surface of the silicon-nanoparticles are then able to react with oxygen or nitrogen-containing functional groups from the pyrolytic carbon precursor to provide a functionalized silicon nanoparticle intermediate. Following pyrolysis, reaction between the oxygen or nitrogen-containing functional groups from the pyrolytic carbon precursor and the silicon surface forms a durable bond at the interface between the carbon matrix and the surface of the silicon nanoparticles. This bond ensures that, even as the silicon nanoparticles expand and contract during charging and discharging, a robust connection between the silicon nanoparticles and the carbon matrix is maintained, thereby providing the advantages described herein with regard to the second and third aspects of the invention.

The pyrolytic carbon precursor is preferably selected from an aromatic or aliphatic carbon-containing precursor material comprising at least one oxygen or nitrogen atom.

Examples of suitable aromatic pyrolytic carbon precursors include one or more of pyrrole, acrylonitrile, 2,3-dihydroxynaphthalene, 2,3-diaminonaphthalene, 1,5-dihydroxynaphthalene, 1,5-diaminonaphthalene, 1,8-dihydroxynaphthalene, 1,8-diaminonaphthalene, 2,3-dihydroxyanthracene, 2,3-diaminoanthracene, 4,5-dihydroxyanthracene, 4,5-diaminoanthracene, 9,10-phenanthraquinone, 2,3-dihydroxytetracene, fluorinated 2,3-dihydroxytetracene, trifloro-methyl-2,3-dihydroxytetracene, 2,3-diaminotetracene, fluorinated 2,3-diaminotetracene, trifluoromethyl-2,3-diaminotetracene, 2,3-dihydroxypentacene, fluorinated 2,3-dihydroxypentacene, trifluoromethyl-2,3-dihydroxypentacene, 2,3-diaminopentacene, fluorinated 2,3-diaminopentacene, trifluoromethyl-2,3-diaminopentacene, 2,3-dihydroxyhexacene, fluorinated 2,3-dihydroxyhexacene, trifluoromethyl-2,3-dihydroxyhexacene, 2,3-diaminohexacene, fluorinated 2,3-diaminohexacene, trifluoromethyl-2,3-diaminohexacene, 1,2-dihydroxypyrene, fluorinated 1,2-dihydroxypyrene, trifluoromethyl-1,2-dihydroxypyrene, 1,2-diaminopyrene, fluorinated 1,2-diaminopyrene, trifluoromethyl-1,2-diaminopyrene, catechol, dihydroxychrysene, fluorinated dihydroxychrysene, trifluoromethyl dihydroxychrysene, corrole, a porphyrin, hepta-2,4,6-triene-one, maleic acid, cyanobenzene, fumaronitrile, 4,5-dihydroxybiphenol, 2,3-dihydroxybiphenol, benzidene, dihydroxystilbene, steridonic acid, eicosapentaenoic acid, gamma-linolenic acid, quinoline, isoquinoline, indole, purine, imidazole, adenine, guanine, tetrahydroquinoline, 1,2-dihydroquinoline, quinolin-2(1H)-one, isoquinolin-2(1H)-one, carbazole, phenoxazine, phenothiazine, phenoxathiine, 2,3-dihydroazepine, 2,5-dihydroazepine, azepine, 1,2-diazepine, 1,3-diazepine, 1,4-diazepine, 1,6-dihydropyrrolo-[2,3-b]-pyrrole, indoline, 3H-indole, 1H-indole, 2H-indole, 1H-indazole, benzimidazole, 4-azaindole, 5-azaindole, 6-azaindole, 7-azaindole, isophthalic acid, terephthalic acid, phenol-formaldehyde resins, tannic acid, furfuryl alcohol, and 2-naphthol.

Preferred aromatic pyrolytic carbon precursors include catechol, 2,3-dihydroxynaphthalene,1,5-dihydroxynaphthalene, 2,3-dihydroxyanthracene and 1,5-dihydroxyanthracene and mixtures thereof.

Pyrolytic carbon precursors also include alkane diols, polyvinylalcohol, camphor and gum roisin (rosin).

Suitable pyrolytic carbon precursors also include carbon-containing compounds comprising one or more electrophilic functional groups (particularly functional groups comprising a carbonyl moiety, preferably ester or amide groups). Preferably, the pyrolytic carbon precursor comprises a polymer or oligomer comprising a carbon-containing backbone and pendant electrophilic functional groups, preferably pendant functional groups comprising a carbonyl moiety, more preferably pendant amide or ester groups, particularly pendant cyclic ester or amide groups. Most preferably, the pyrolytic carbon precursor comprises a polymer or oligomer comprising a carbon-containing backbone and pendant cyclic amide groups. Particularly preferred pyrolytic carbon precursors in this category include polyvinylpyrrolidone (PVP) homopolymer, as well as copolymers of vinylpyrrolidone with one or more other ethylenically unsaturated monomers. Preferably copolymers of vinylpyrrolidone comprise at least 50 mol % vinylpyrrolidone monomers.

Optional step (d) comprises heating the coated silicon nanoparticles to a temperature in the range of 100 to 400° C., optionally 200 to 400° C. for a period of time (e.g. from 5 minutes to 10 hours) before further heating the coated silicon nanoparticles to the pyrolysis temperature. Preferably, the temperature in step (d) is selected such that it is between the melting point and the boiling point of the pyrolytic carbon precursor.

In a preferred embodiment of the claimed method, the pyrolytic carbon precursor is selected from compounds comprising one or more electrophilic functional groups as described above, and step (d) comprises the formation of cross-links between nucleophilic functional groups on the surface of the silicon nanoparticles and the electrophilic functional groups of the pyrolytic carbon precursor.

It has been found that a cross-linking reaction between the silicon nanoparticles and the pyrolytic carbon precursor results in the formation of a denser and more strongly-bound conductive carbon matrix having lower microporosity. As a result the conductive carbon matrix has higher conductivity and the composite particles exhibit reduced first cycle loss. However, the inventors have discovered that this cross-linking reaction (also referred to herein as a curing reaction) between the silicon nanoparticles and the pyrolytic carbon precursor is highly exothermic and control of the reaction temperature is found to be a critical factor for an effective cross-linking process, and therefore enables control of the elemental composition of the composite particles within the preferred ranges set out below and in relation to the second and third aspects of the invention.

Specifically, the present inventors have identified that when silicon nanoparticles coated with a pyrolytic carbon precursor comprising one or more electrophilic functional groups (e.g. PVP) are heated to above 100° C., the resulting cross-linking reaction is highly exothermic, leading to a rapid and uncontrolled temperature increase. The inventors have observed that the temperature of particles within the heating oven or kiln can vary significantly depending on location and other features such as crucible size and shape, with the effect that the temperature in the cross-linking reaction can be highly inhomogeneous, with disadvantageous effects on the properties of the final composite particles.

Without being bound by theory, it is believed that excess heat due to the exothermic cross-linking reaction results in results in cleavage of the pyrolytic carbon precursor and loss of the electrophilic functional groups, before the cross-linking reaction can proceed to completion. The cleaved electrophilic functional groups are therefore no longer available to participate in the cross-linking reaction with the silicon nanoparticle surface. Insufficient cross-linking therefore results in inferior performance in the final composite particles.

It has therefore been found that careful control of the conditions in step (d) enables the degree of crosslinking obtained in the crosslinking reaction to be maximized, by avoiding unwanted cleavage reactions caused by excessive heat from the reaction, therefore resulting in an improved carbon matrix following pyrolysis in step (e).

Thus, in accordance with the claimed method, the pyrolytic carbon precursor is preferably selected from compounds comprising one or more electrophilic functional groups, as described above, and step (d) comprises cross-linking the coated silicon nanoparticles and the pyrolytic carbon precursor under conditions such that the temperature increase in the reaction mixture is controlled to no more than 5° C./min and the maximum temperature of the crosslinking reaction is maintained below 270° C. for the duration of the crosslinking reaction. The completion of the crosslinking reaction may be identified by the cessation of heat generation by the reaction exotherm.

Preferably, step (d) further comprises mixing or agitating the coated silicon nanoparticles so as to ensure a homogenous reaction temperature during the crosslinking step. For instance, step (d) may be carried out in a rotary kiln.

Optionally, the maximum temperature of the crosslinking reaction is maintained below 250° C., below 240° C., below 230° C., below 220° C., below 210° C., or below 200° C. for the duration of the crosslinking reaction.

The controlled crosslinking reaction in step (d) according to the invention results in a unique interfacial structure between the silicon nanoparticle core and the conductive carbon matrix following pyrolysis in step (e). Specifically, the crosslinking reaction results in the presence of nitrogen and oxygen compounds at the interface between the silicon nanoparticle core and the conductive carbon matrix. These oxygen and nitrogen compounds are believed to take the form of a plurality of bridging oxygen atoms and/or a plurality or bridging nitrogen atoms disposed between the nanoparticle surface and the conductive carbon matrix. The content of oxygen and/or nitrogen in the composite particles following pyrolysis is therefore indicative of an effective crosslinking process and is therefore associated with improved performance.

More preferably, the pyrolytic carbon precursor is selected from comprises a polymer or oligomer comprising a carbon-containing backbone structure and pendant electrophilic functional groups, preferably functional groups comprising a carbonyl moiety, more preferably amide or ester groups, particularly cyclic ester or amide groups. A particularly preferred pyrolytic carbon precursor in the context of the crosslinking reaction is polyvinylpyrrolidone (PVP), or a copolymer of vinylpyrrolidone as described above.

Preferably, the crosslinking reaction in step (d) is carried out in the presence of oxygen gas. For instance, the crosslinking reaction in step (d) may be carried out in the presence of air. Although the presence of oxygen gas, e.g. from air, is found to promote the crosslinking reaction, excessive temperature in the crosslinking reaction may result in undesirable oxidation of silicon to silica. In addition to optimizing the cross-linking reaction, the method of the invention therefore also reduces the unwanted oxidation of silica.

Most preferably, the pyrolytic carbon precursor is PVP, and step (d) comprises crosslinking the coated silicon nanoparticles a reaction temperature that is controlled within the range of from 100 to 300° C., more preferably from 150 to 280° C., more preferably from 180 to 280° C., for the duration of the crosslinking reaction; wherein the crosslinking reaction is carried out in the presence of air.

Optionally, step (d) may comprise maintaining the coated silicon nanoparticles at a temperature in the range of from 100 to 400° C. for a period of time (e.g. from 10 minutes to 2 hours) after completion of the crosslinking reaction (as determined by cessation of the reaction exotherm. This curing process may facilitate various rearrangements of the pyrolytic carbon precursor at the silicon surface, for instance allowing the pyrolytic carbon precursor to migrate to vacant areas of the silicon surface and/or allowing the pyrolytic carbon precursor to adopt a more thermodynamically-stable arrangement. It is thought that this may contribute to improved bonding between the silicon nanoparticles and the conductive carbon matrix and/or to improved conductivity of the conductive carbon matrix.

The coated silicon nanoparticles from step (c) or (d) are subjected to pyrolysis in step (e) to form a conductive pyrolytic carbon matrix. The pyrolysis is preferably carried out at a temperature in the range of from 700 to 1150° C., or in the range of from 800 to 1100° C., or in the range of from 900 to 1050° C. It is found that the conductivity of the pyrolytic carbon matrix is dependent both on the selected pyrolytic carbon precursor and the pyrolysis temperature. Pyrolysis temperatures above 700° C. are generally preferred in order to obtain a pyrolytic carbon matrix of high conductivity. The pyrolysis step (e) may be carried out for a period in the range of from 5 minutes to 120 minutes, for example from 10 minutes to 100 minutes, from 20 minutes to 80 minutes, or from 40 minutes to 60 minutes.

The pyrolysis step (e) is preferably carried out in an inert or reducing atmosphere. For example, the pyrolysis may be carried out under argon or nitrogen, preferably nitrogen, or under a mixture of argon or nitrogen with carbon monoxide or hydrogen.

The silicon starting material preferably has a purity of at least 95% by weight, at least 98% by weight, or at least 99% by weight.

The silicon starting material may suitably be selected from metallurgical grade silicon. Metallurgical grade silicon is obtained by the reduction of high purity silica using charcoal in an electric arc furnace at temperatures of ca. 1900° C. Metallurgical grade silicon typically comprises silicon alloyed with minor amounts of other elements and is available in a variety of grades, with purities ranging from 95% by weight to above 99% by weight. Common impurities in metallurgical grade silicon include calcium, aluminium, iron copper, gallium, and titanium and the oxides thereof.

The silicon starting material may comprise amorphous silicon, polycrystalline silicon or monocrystalline silicon.

The silicon starting material preferably comprises no more than 4 wt % oxygen, more preferably no more than 2 wt % oxygen, more preferably no more than 1 wt % oxygen, more preferably no more than 0.5 wt % oxygen.

The silicon-containing starting material is preferably in the form of silicon microparticles, for instance having a $D_{50}$ particle size in the range of from 1 to 100 µm, more preferably in the range of from 2 to 50 µm, more preferably in the range of from 2 to 20 µm, more preferably in the range of from 2 to 10 µm. If smaller particles of silicon-containing starting material are used, the amount of fresh silicon surface exposed during step (a) is decreased and there may be an excessive amount silicon surface carrying native oxide from the starting material. Larger particles may be more difficult to mill efficiently to the nanoparticle size range. However, it is not excluded that larger silicon-containing particles or monoliths (e.g. ingots or wafers) may undergo a preliminary comminution step (e.g. grinding or milling) and optionally sieving to obtain silicon microparticles in the preferred size range of the silicon-containing starting material.

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "Do" and "Do particle diameter" as used herein refer to the 90th percentile volume-based median particle diameter, i.e. the diameter below which 90% by volume of the particle population is found. The terms "$D_{99}$" and "$D_{99}$ particle diameter" as used herein refer to the 99th percentile volume-based median particle diameter, i.e. the diameter below which 99% by volume of the particle population is found.

Particle diameters and particle size distributions can be determined by routine laser diffraction techniques. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer 3000 particle size analyzer from Malvern Instruments. The Malvern Mastersizer 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

Step (a) may be carried out using any suitable wet-milling process, for instance ball milling, planetary milling, jet milling or a combination thereof. Suitable solvents for step (a) include hydrocarbons (e.g. selected toluene, xylenes, n-hexane, n-heptane, n-octane, decane, dodecane and petroleum ether), ethers (e.g. selected from tetrahydrofuran, diglyme and triglyme), ketones (e.g. selected from acetone methylethylketone), alcohols (e.g. selected from isopropyl alcohol and n-butyl alcohol), and halogenated solvents (e.g. selected from 1,2-dichloroethane, 1,1,1-trichloroethane). Other suitable solvents include acetonitrile, dimethylformamide (DMF) and dimethylsulfoxide (DMSO). Preferred solvents include alcohols and ketones. A particularly preferred solvent is isopropyl alcohol.

The solvent may be used in an amount of from 5 to 50 wt % based on the weight of the silicon starting material, e.g from 10 to 25 wt % based on the weight of the silicon starting material.

Step (a) may be carried out under conditions which minimize unwanted side-reactions at the freshly-exposed surfaces of the silicon nanoparticles. The solvent used in step (a) may be a degassed and/or anhydrous solvent. For instance, the solvent may comprise less than 10 ppmw (parts per million by weight) of oxygen, less than 5 ppmw of oxygen, or less than 1 ppmw of oxygen. The solvent may comprise less than 10 ppmw (parts per million by weight) of water, less than 5 ppmw of water, or less than 1 ppmw of water. More preferably, the solvent may comprise less than 10 ppmw (parts per million by weight) each of oxygen and water, less than 5 ppmw each of oxygen and water, or less than 1 ppmw each of water and oxygen. Step (a) may also be carried out under an anaerobic and/or anhydrous atmosphere, for instance under an inert gas such as nitrogen or oxygen. Alternatively, step (a) may be carried out in a milling vessel in which the headspace is minimized so as to substantially exclude atmospheric water and/or oxygen from the milling process. Preferably, the headspace of the milling vessel is flushed with an inert gas, such as nitrogen, prior to milling.

Optionally, the $D_{50}$ particle diameter of the silicon nanoparticles formed in step (a) may be at least 50 nm, or at least 60 nm, or at least 70 nm, or at least 75 nm, for example at least 80 nm. Optionally the $D_{50}$ particle diameter of the silicon nanoparticles formed in step (a) may be no more than 300 nm, more preferably no more than 250 nm, more preferably no more than 200 nm, more preferably no more than 150 nm, more preferably no more than 120 nm.

The silicon nanoparticles formed in step (a) preferably have a $D_{50}$ particle diameter in the range of from 50 to 250 nm, more preferably in the range of from 60 to 200 nm, more preferably in the range of from 70 to 150 nm, more preferably in the range of from 80 to 120 nm. For example the $D_{50}$ particle diameter of the silicon nanoparticles formed in step (a) may be about 100 nm.

The $D_{10}$ particle diameter of the silicon nanoparticles formed in step (a) may be at least 10 nm, more preferably at least 20 nm, more preferably at least 40 nm, more preferably at least 60 nm. The $D_{90}$ particle diameter of the silicon nanoparticles formed in step (a) may be no more than 500 nm, more preferably no more than 400 nm, more preferably no more than 300 nm, more preferably no more than 200 nm. The silicon nanoparticles formed in step (a) may have a particle size distribution span (as defined above) of 5 or less, more preferably 4 or less, more preferably 3 or less, more preferably 2 or less, more preferably 1.5 or less.

Steps (a) and (b) may be carried out simultaneously, such that the silicon nanoparticles are contacted with the pyrolytic carbon precursor in situ during milling of the silicon starting material. Alternatively, steps (a) and (b) may be carried out sequentially. Where steps (a) and (b) are carried out sequentially, step (b) may comprise adding a solution of the pyrolytic carbon precursor in a non-aqueous solvent to the dispersion of silicon nanoparticles from step (a), optionally with mixing or agitation sufficient to ensure a homogenous distribution of the pyrolytic carbon precursor in the silicon nanoparticle dispersion. The solvent used to dissolve the pyrolytic carbon precursor may be the same solvent as is used for the milling of the silicon starting material in step (a).

Step (b) is suitably carried out so as to avoid contact of the silicon nanoparticles with oxygen and/or water. For example, the dispersion of silicon nanoparticles from step (a) may be stored under an anaerobic and/or anhydrous atmosphere prior to step (b). The contacting of the silicon nanoparticles with the pyrolytic carbon precursor is suitably also carried out under an anaerobic and/or anhydrous inert atmosphere. In addition, the pyrolytic carbon precursor or the solution thereof in a non-aqueous solvent is preferably degassed and anhydrous. For instance, the pyrolytic carbon precursor or the solution thereof may comprise less than 10 ppmw (parts per million by weight) of oxygen, less than 5 ppmw of oxygen, or less than 1 ppmw of oxygen. The pyrolytic carbon precursor or the solution thereof may comprise less than 10 ppmw (parts per million by weight) of water, less than 5 ppmw of water, or less than 1 ppmw of water. More preferably, the pyrolytic carbon precursor or the solution thereof may comprise less than 10 ppmw (parts per million by weight) each of oxygen and water, less than 5 ppmw each of oxygen and water, or less than 1 ppmw each of water and oxygen.

The weight loss from the pyrolytic carbon precursor during pyrolysis is typically in the range of from 40 to 70 wt % depending on the structure of the pyrolytic carbon precursor and the pyrolysis conditions. Accordingly, the weight ratio of the pyrolytic carbon precursor to silicon is typically selected to be around 1.5 to 3.5 higher than the desired weight ratio of carbon to silicon in the particulate material product. For example the weight ratio of the pyrolytic carbon precursor to silicon in step (b) may be in the range of from 0.15 to 4, more preferably from 0.2 to 3, for example from 0.3 to 2.5.

The solvent may be removed in step (c) by any conventional means. One solvent removal technique comprises evaporation of the solvent under reduced pressure, for instance using rotary evaporation apparatus, optionally while providing sufficient heat to prevent freezing of the solvent. More preferably, the solvent may be removed by spray drying to form a powder of composite particles comprising the silicon nanoparticles dispersed within the pyrolytic carbon precursor. The solvent removal process is suitably controlled so as to avoid excessive solvent vapour velocity as this may result in the silicon nanoparticles becoming entrained in the vapour stream.

The material obtained from step (c) comprises silicon nanoparticles dispersed in a matrix of the pyrolytic carbon precursor. This material may be stored under an inert (e.g. anaerobic and/or anhydrous) atmosphere prior to step (d) or (e). However, it is found that the coating of the pyrolytic carbon precursor and/or solvent passivation may provide sufficient protection of the silicon nanoparticles to prevent unwanted reactions of the silicon with oxygen or water.

The conductive carbon matrix obtained by pyrolysis step (e) typically has an amorphous structure with graphite-like character as evidenced by the large G-band (~1600 cm$^{-1}$) in the Raman spectrum. However, the carbon is not fully graphitic as evidenced by the significant D-band (~1350 cm$^{-1}$) in the Raman spectrum.

The pyrolysis of the coated silicon nanoparticles in step (e) results in the formation of a conductive carbon matrix in which the silicon nanoparticles are dispersed. The conductive carbon matrix may comprise large and/or irregular particles having dimensions from 100 μm to several tens of millimetres. The particulate material from step (e) therefore may be subjected to a size reduction step (f) to obtain a particulate material with reduced particle sizes. Any suitable size reduction technique may be used, for instance ball milling, planetary milling, jet milling or a combination thereof. Step (f) may be carried out in the presence of a solvent (wet milling) or a dry milling technique may be used. If wet milling is used, the solvent may be removed by any conventional means, for example evaporation under reduced pressure.

The particulate material from step (e) or step (f) may optionally be subjected to a sieving step (g) in order to remove outsize particles.

The particulate material from step (e), (f) or (g) may be modified by the addition of a carbon coating. Preferably, the carbon coating is obtained by a chemical vapour deposition (CVD) method. CVD is a well-known methodology in the art and comprises the thermal decomposition of a volatile carbon-containing gas (e.g. ethylene) onto the surface of the particulate material. Formation of the carbon coating by CVD may be carried out concurrently with the pyrolysis in step (e), or immediately following the pyrolysis in step (e). For instance, a suitable volatile carbon-containing gas, such as ethylene, may be introduced into the pyrolysis reactor once the pyrolysis reaction is substantially complete.

Alternatively, the carbon coating may be formed by depositing a solution of a carbon-containing compound onto the surface of the particulate material followed by pyrolysis. Suitable carbon-containing compounds include the pyrolytic carbon precursors described above.

A carbon coating has the advantages that it further reduces the BET surface area of the particulate material by smoothing any surface defects and by filling any remaining surface microporosity, thereby further reducing first cycle loss. In addition, a carbon coating improves the conductivity of the surface of the composite particles, reducing the need for conductive additives in the electrode composition, and also creates an optimum surface for the formation of a stable SEI layer, resulting in improved capacity retention on cycling.

The particulate material prepared according to the method of the invention preferably comprises 40 to 65 wt % silicon, more preferably 43 to 65 wt % silicon, more preferably 45 to 65 wt % silicon. For instance, the particulate material may comprise 48 to 62 wt % silicon, or 50 to 60 wt % silicon, or 52 to 58 wt % silicon.

The weight ratio of the total amount of oxygen and nitrogen to silicon in the particulate material prepared according to the method of the invention is preferably in the range of from 0.1 to 0.45.

For instance, the weight ratio of the total amount of oxygen and nitrogen to silicon in the composite material from step (e) may be no more than 0.42, or no more than 0.4, or no more than 0.38, or no more than 0.35. Optionally, the weight ratio of the total amount of oxygen and nitrogen to silicon may be from 0.1 to 0.42, or from 0.1 to 0.4, or from 0.1 to 0.38, or from 0.1 to 0.35.

The weight ratio of the total amount of oxygen and nitrogen to silicon in the particulate material prepared according to the method of the invention may be at least 0.2, more preferably at least 0.24, more preferably at least 0.28, more preferably at least 0.3, more preferably at least 0.32, more preferably at least 0.34.

Preferably, the weight ratio of the total amount of oxygen and nitrogen to silicon in the particulate material prepared according to the method of the invention may be in the range of from 0.25 to 0.42, more preferably from 0.28 to 0.4, more preferably from 0.3 to 0.38, and most preferably from 0.32 to 0.38.

The weight ratio of carbon to silicon in the composite material from step (e) is preferably in the range of 0.1 to 1.

The weight ratio of carbon to silicon in the particulate material prepared according to the method of the invention may be at least 0.15, more preferably at least 0.2, more preferably at least 0.25, more preferably at least 0.3.

The weight ratio of carbon to silicon in the particulate material prepared according to the method of the invention may be no more than 0.8, more preferably no more than 0.7, more preferably no more than 0.6, more preferably no more than 0.55, more preferably no more than 0.5, more preferably no more than 0.0.45.

For example, the weight ratio of carbon to silicon in the particulate material prepared according to the method of the invention may be from 0.2 to 0.6, more preferably from 0.25 to 0.5, more preferably from 0.3 to 0.45.

The weight ratio of carbon to total amount of oxygen and nitrogen (i.e. weight[C]:weight[O+N]) in the particulate material prepared according to the method of the invention may be at least 0.7, more preferably at least 0.8, more preferably at least 0.85, or at least 0.9, or at least 0.95.

The particulate material prepared according to the method of the invention preferably comprises at least 8 wt % oxygen, or at least 10 wt % oxygen, or at least 12 wt % oxygen, or at least 15 wt % oxygen.

The particulate material prepared according to the method of the invention preferably comprises from 8 to less than 20 wt % oxygen, more preferably from 10 to less than 20 wt % oxygen, more preferably from 12 to less than 20 wt % oxygen, more preferably from 15 to less than 20 wt % oxygen.

The particulate material prepared according to the method of the invention preferably comprises 2 to 6 wt % nitrogen, more preferably from 2.5 to 5 wt % nitrogen, more preferably from 3 to 4.5 wt % nitrogen, and most preferably from 3.5 to 4.5 wt % nitrogen. Nitrogen-containing particulate materials may be prepared from nitrogen-containing pyrolytic carbon precursors as described herein.

The particulate material prepared according to the method of the invention preferably comprises at least 10 wt % carbon, or at least 15 wt % carbon, or at least 18 wt % carbon. The particulate material prepared according to the method of the invention preferably comprises no more than 35 wt % carbon, no more than 30 wt % carbon, no more than 28 wt % carbon, or no more than 25 wt % carbon. For instance, the particulate material prepared according to the method of the invention may comprise 15 to 30 wt % carbon, or more preferably 18 to 25 wt % carbon.

In a preferred embodiment, the particulate material prepared according to the method of the invention comprises from 43 to 65 wt % silicon, from 10 to less than 20 wt % oxygen, from 2 to 6 wt % nitrogen, and from 15 to 30 wt % carbon; wherein the weight ratio of the total amount of oxygen and nitrogen in the particulate material to silicon in the particulate material is in the range of from 0.25 to 0.42; and wherein the weight ratio of carbon to silicon in the particulate material is in the range of 0.2 to 0.6.

In a more preferred embodiment, the particulate material prepared according to the method of the invention comprises from 48 to 62 wt % silicon, from 12 to less than 20 wt % oxygen, from 2.5 to 5 wt % nitrogen, and from 18 to 25 wt % carbon; wherein the weight ratio of the total amount of oxygen and nitrogen in the particulate material to silicon in the particulate material is in the range of from 0.28 to 0.4; and wherein the weight ratio of carbon to silicon in the particulate material is in the range of from 0.25 to 0.5.

In a particularly preferred embodiment, the particulate material prepared according to the method of the invention comprises from 50 to 60 wt % silicon, from 15 to less than 20 wt % oxygen, from 3 to 4.5 wt % nitrogen, and from 18 to 25 wt % carbon; wherein the weight ratio of the total amount of oxygen and nitrogen in the particulate material to silicon in the particulate material is in the range of from 0.3 to 0.38; and wherein the weight ratio of carbon to silicon in the particulate material is in the range of from 0.3 to 0.45.

The particulate material prepared according to the method of the invention may optionally comprise a minor amount of one or more additional elements other than silicon, carbon or oxygen. For instance, the particulate material may comprise a minor amount of one or more additional elements selected from Al, Sb, Cu, Mg, Zn, Mn, Cr, Co, Mo, Ni, Be, Zr, Fe, Na, Sr, P, Sn, Ru, Ag, Au, Ti. Such elements may be present as minor impurities in the silicon nanoparticles, for instance when the silicon nanoparticles are obtained from metallurgical grade silicon. For example, the particulate material may comprise 0.1-8 wt % of one or more elements selected from aluminium, iron, copper, gallium, magnesium, calcium, titanium and zirconium with the balance of the material being silicon, carbon and oxygen. Alternatively such elements may be present from the manufacturing process.

Preferably, the particulate material prepared according to the method of the invention comprises at least 80 wt % in total of silicon, carbon, oxygen and nitrogen, at least 85 wt % in total of silicon, oxygen, nitrogen and carbon, at least 90 wt % in total of silicon, oxygen, nitrogen and carbon, or at least 95 wt % in total of silicon, oxygen and carbon, for example at least at least 98 wt % in total of silicon, oxygen, nitrogen, and carbon, or at least 99 wt % in total of silicon, oxygen, nitrogen, and carbon.

In a second aspect, the invention provides a particulate material consisting of a plurality of composite particles, wherein the composite particles comprise a plurality of silicon nanoparticles dispersed within a conductive carbon matrix, wherein:
- the silicon nanoparticles comprise a nanoparticle core and a nanoparticle surface, wherein the nanoparticle surface comprises a compound of oxygen or a compound of nitrogen or a mixture thereof disposed between the nanoparticle core and the conductive carbon matrix;
- the particulate material comprises 40 to 65 wt % silicon;
- the particulate material comprises at least 6 wt % and less than 20 wt % oxygen;
- the weight ratio of the total amount of oxygen and nitrogen to silicon in the particulate material is in the range of from 0.1 to 0.45; and
- the weight ratio of carbon to silicon in the particulate material is in the range of from 0.1 to 1.

In a third aspect, the invention provides a particulate material consisting of a plurality of composite particles, wherein the composite particles comprise a plurality of silicon nanoparticles dispersed within a conductive carbon matrix, wherein:
- the silicon nanoparticles comprise a nanoparticle core and a nanoparticle surface, wherein a plurality of bridging oxygen atoms and/or a plurality or bridging nitrogen atoms are disposed between the nanoparticle surface and at least a portion of the conductive carbon matrix such that the conductive carbon matrix is chemically bonded to the nanoparticle surface; and
- the particulate material comprises 40 to 65 wt % silicon;
- the particulate material comprises at least 6 wt % and less than 20 wt % oxygen; the weight ratio of the total amount of oxygen and nitrogen in the particulate material
- to silicon in the particulate material is in the range of from 0.1 to 0.45; and the weight ratio of carbon to silicon in the particulate material is in the range of from 0.1 to 1.

It has been found that the particulate materials of the invention have particularly advantageous properties for use in hybrid electrodes for metal-ion batteries. The use of silicon nanoparticles avoids the excessive mechanical strain during lithiation and delithiation that occurs in larger particles. However, by providing the silicon nanoparticles in the form of composite particles wherein the silicon nanoparticles are dispersed within a conductive carbon matrix, the handling problems associated with silicon nanoparticles may be overcome.

Furthermore, the particulate materials of the invention have a unique interface between the carbon matrix and the surface of the silicon nanoparticles. The carbon matrix of the composite particles of the invention therefore does not merely provide a coating over the surface of the silicon nanoparticles. The unique chemistry at the interface of the carbon matrix and the silicon nanoparticles ensures that, even as the silicon nanoparticles expand and contract during charging and discharging, a robust connection between the silicon nanoparticles and the carbon matrix is maintained. As a result, electrical conductivity between the silicon nanoparticles, the carbon matrix and the anode current collector is effectively maintained. As a result of their unique structure, the particulate materials of the invention avoid many of the capacity fading mechanisms that are characteristic of the use of silicon as an anode active material in metal ion batteries. In particular, it has been found that the particulate materials of the invention are associated with reduced first cycle loss and improved capacity retention when compared with other silicon-containing particulate forms disclosed in the art for use in metal-ion batteries.

The particulate materials of the invention may be used to provide hybrid anodes having increased volumetric capacity when compared to anodes comprising only graphite as an active material. In addition, the particulate materials are sufficiently robust to survive manufacture and incorporation into anode layers without loss of structural integrity, particularly when anode layers are calendered to produce a dense uniform layer, as is conventional in the art.

The particulate materials of the invention preferably comprise 43 to 65 wt % silicon, more preferably 45 to 65 wt % silicon. For instance, the particulate material of the invention may comprise 48 to 62 wt % silicon, or 50 to 60 wt % silicon, or 52 to 58 wt % silicon.

The weight ratio of the total amount of oxygen and nitrogen to silicon (i.e. weight[O+N]:weight[Si]) in the particulate materials of the invention may be no more than 0.42, or no more than 0.4, or no more than 0.38, or no more than 0.35. Optionally, the weight ratio of the total amount of oxygen and nitrogen to silicon may be from 0.1 to 0.42, or from 0.1 to 0.4, or from 0.1 to 0.38, or from 0.1 to 0.35.

The weight ratio of the total amount of oxygen and nitrogen to silicon in the particulate materials of the invention may be at least 0.2, more preferably at least 0.24, more preferably at least 0.28, more preferably at least 0.3, more preferably at least 0.32, more preferably at least 0.34.

Preferably, the weight ratio of the total amount of oxygen and nitrogen to silicon may be in the range of from 0.25 to 0.42, more preferably from 0.28 to 0.4, more preferably from 0.3 to 0.38, and most preferably from 0.32 to 0.38.

The particulate materials of the invention may optionally comprise a minor amount of one or more additional elements other than silicon, carbon, oxygen and nitrogen. For instance, the particulate materials may comprise a minor amount of one or more additional elements selected from Al, Sb, Cu, Mg, Zn, Mn, Cr, Co, Mo, Ni, Be, Zr, Fe, Na, Sr, P, Sn, Ru, Ag, Au, Ti. Such elements may be present as minor impurities in the silicon nanoparticles, for instance when the silicon nanoparticles are obtained from metallurgical grade silicon. For example, the particulate materials of the invention may comprise 0.1-8 wt % of one or more elements selected from aluminium, iron, copper, gallium, magnesium, calcium, titanium and zirconium with the balance of the material being silicon, carbon, and oxygen and/or nitrogen. Alternatively such elements may be present from the manufacturing process.

Preferably, the particulate materials of the invention comprise at least 80 wt % in total of silicon, carbon, oxygen and nitrogen, at least 85 wt % in total of silicon, oxygen, nitrogen and carbon, at least 90 wt % in total of silicon, oxygen, nitrogen and carbon, or at least 95 wt % in total of silicon, oxygen, nitrogen and carbon, for example at least 98 wt % in total of silicon, oxygen, nitrogen and carbon, or at least 99 wt % in total of silicon, oxygen, nitrogen and carbon.

The weight ratio of carbon to silicon in the particulate materials of the invention is preferably at least 0.15, more preferably at least 0.20, more preferably at least 0.25, more preferably at least 0.3. The weight ratio of carbon to silicon in the particulate material may be no more than 0.8, more preferably no more than 0.7, more preferably no more than 0.6, more preferably no more than 0.55, more preferably no more than 0.5, more preferably no more than 0.45.

For example, the weight ratio of carbon to silicon in the particulate materials of the invention may be from 0.2 to 0.6, more preferably from 0.25 to 0.5, more preferably from 0.3 to 0.45.

The weight ratio of carbon to total amount of oxygen and nitrogen (i.e. weight[C]:weight[O+N]) in the particulate materials of the invention may be at least 0.7, more preferably at least 0.8, more preferably at least 0.85, or at least 0.9, or at least 0.95.

The particulate materials of the invention preferably comprise at least 8 wt % oxygen, or at least 10 wt % oxygen, or at least 12 wt % oxygen, or at least 15 wt % oxygen.

The particulate materials of the invention may comprise less than 18 wt % oxygen.

The particulate materials of the invention preferably comprise from 8 to less than 20 wt % oxygen, more preferably from 10 to less than 20 wt % oxygen, more preferably from 12 to less than 20 wt % oxygen, more preferably from 15 to less than 20 wt % oxygen.

In preferred embodiments, the particulate materials of the invention comprise 2 to 6 wt % nitrogen, more preferably from 2.5 to 5 wt % nitrogen, more preferably from 3 to 4.5 wt % nitrogen, and most preferably from 3.5 to 4.5 wt % nitrogen.

The particulate materials of the invention preferably comprise at least 10 wt % carbon, at least 15 wt % carbon, or at least 18 wt % carbon. The particulate materials of the invention preferably comprise no more than 35 wt % carbon, no more than 30 wt % carbon, no more than 28 wt % carbon, or no more than 25 wt % carbon. For instance, the particulate materials of the invention may comprise 15 to 30 wt % carbon, or more preferably 18 to 25 wt % carbon.

In a preferred embodiment, the particulate materials of the invention comprise from 43 to 65 wt % silicon, from 10 to less than 20 wt % oxygen, from 2 to 6 wt % nitrogen, and from 15 to 30 wt % carbon; wherein the weight ratio of the total amount of oxygen and nitrogen in the particulate material to silicon in the particulate material is in the range of from 0.25 to 0.42; and wherein the weight ratio of carbon to silicon in the particulate material is in the range of from 0.2 to 0.6.

In a more preferred embodiment, the particulate materials of the invention comprise from 48 to 62 wt % silicon, from 12 to less than 20 wt % oxygen, from 2.5 to 5 wt % nitrogen, and from 18 to 25 wt % carbon; wherein the weight ratio of the total amount of oxygen and nitrogen in the particulate material to silicon in the particulate material is in the range of from 0.28 to 0.4; and wherein the weight ratio of carbon to silicon in the particulate material is in the range of from 0.25 to 0.5.

In a particularly preferred embodiment, the particulate materials of the invention comprise from 50 to 60 wt % silicon, from 15 to less than 20 wt % oxygen, from 3 to 4.5 wt % nitrogen, and from 18 to 25 wt % carbon; wherein the weight ratio of the total amount of oxygen and nitrogen in the particulate material to silicon in the particulate material is in the range of from 0.3 to 0.38; and wherein the weight ratio of carbon to silicon in the particulate material is in the range of from 0.3 to 0.45.

The conductive carbon matrix in the composite particles is obtainable by the pyrolysis of a pyrolytic carbon precursor, as described with reference to the first aspect of the invention. The conductive carbon matrix obtained by pyrolysis (referred to herein as "pyrolytic carbon") may have an amorphous structure with graphite-like character as evidenced by the large G-band (~1600 $cm^{-1}$) in the Raman spectrum.

The composite particles may have a $D_{50}$ particle diameter in the range of from 1 to 25 µm. Optionally, the $D_{50}$ particle diameter may be at least 2 µm, more preferably at least 3 µm, more preferably at least 4 µm, more preferably at least 5 µm. Optionally the $D_{50}$ particle diameter may be no more than 20 µm, more preferably no more than 18 µm, more preferably no more than 15 µm, more preferably no more than 12 µm, more preferably no more than 10 µm. For instance, the composite particles may have a $D_{50}$ particle diameter in the range of from 1 to 20 µm, more preferably from 2 to 18 µm, more preferably from 3 to 15 µm, more preferably from 4 to 12 µm, more preferably from 5 to 10 µm. It has been found that particles within this size range and having porosity and a pore diameter distribution as set out herein are ideally suited for use in anodes for metal-ion batteries, due to their dispersibility in slurries, their structural robustness, their capacity retention over repeated charge-discharge cycles, and their suitability for forming dense electrode layers of uniform thickness in the conventional range of from 20 to 50 µm.

The $D_{10}$ particle diameter of the composite particles is preferably at least 0.5 µm, more preferably at least 1 µm, and still more preferably at least 2 µm. By maintaining the $D_{10}$ particle diameter at 1 µm or more, the potential for undesirable agglomeration of sub-micron sized particles is reduced, resulting in improved dispersibility of the particulate material and improved capacity retention.

The $D_{90}$ particle diameter of the composite particles is preferably no more than 40 µm, more preferably no more than 30 µm, more preferably no more than 25 µm, more preferably no more than 20 µm. The presence of large particles results in non-uniform forming packing of the particles in electrode active layers, thus disrupting the formation of dense electrode layers, particularly electrode layers having a thickness in the range of from 20 to 50 µm.

The $D_{99}$ particle diameter of the composite particles is preferably no more than 50 µm, more preferably no more than 40 µm, more preferably no more than 35 µm, and most preferably no more than 30 µm.

The composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

The silicon nanoparticles preferably have a $D_{50}$ particle diameter in the range of from 30 to 500 nm. If the $D_{50}$ particle diameter of the silicon nanoparticles is smaller than 30 nm, the surface area of the particles may become excessive and the amount of oxygen/nitrogen required to bond the silicon nanoparticles to the surrounding conductive carbon matrix may become too large, reducing the lithiation capacity of the silicon. If the $D_{50}$ particle diameter of the silicon nanoparticles is larger than 500 nm, the silicon nanoparticles are less able to pack efficiently within the composite particles and an excessive amount of carbon is then required to compensate for the void space between the silicon nanoparticles. Optionally, the $D_{50}$ particle diameter of the silicon nanoparticles may be at least 50 nm, or at least 60 nm, or at least 70 nm, or at least 75 nm, for example at least 80 nm. Optionally the $D_{50}$ particle diameter of the silicon nanoparticles may be no more than 300 nm, more preferably no more than 250 nm, more preferably no more than 200 nm, more preferably no more than 150 nm, more preferably no more than 120 nm.

The silicon nanoparticles preferably have a $D_{50}$ particle diameter in the range of from 50 to 250 nm, more preferably in the range of from 60 to 200 nm, more preferably in the range of from 70 to 150 nm, more preferably in the range of from 80 to 120 nm. For example the $D_{50}$ particle diameter of the silicon nanoparticles may be about 100 nm.

The $D_{10}$ particle diameter of the silicon nanoparticles may be at least 10 nm, more preferably at least 20 nm, more preferably at least 40 nm, more preferably at least 60 nm. The $D_{90}$ particle diameter of the silicon nanoparticles may be no more than 500 nm, more preferably no more than 400 nm, more preferably no more than 300 nm, more preferably no more than 200 nm. The silicon nanoparticles may have a particle size distribution span (as defined above) of 5 or less, more preferably 4 or less, more preferably 3 or less, more preferably 2 or less, more preferably 1.5 or less. These optimized $D_{10}$, $D_{90}$ and particle size distribution span values are selected so as to minimize the problems associated with excessively small or excessively large silicon nanoparticles as set out above.

The composite particles constituting the particulate materials of the invention preferably have low porosity. For instance, the composite particles may have an intra-particle porosity of no more than 30%, no more than 20%, no more than 10%, no more than 5%, or no more than 2%, as determined by mercury porosimetry. Since the particulate materials of the invention rely on the use of nanoscale silicon particles to manage the mechanical stress of lithiation and delithiation, the presence of a large pore volume within the composite particles merely detracts from the volumetric energy density that is obtainable with the inventive particulate materials. The particulate materials of the invention may be nano-porous and may include pores having a diameter of less than 2 nm distributed throughout their volume.

As used herein, the term "intra-particle porosity" refers to the ratio of the volume of pores within a particle to the total volume of the particle and the term "inter-particle porosity" refers to the volume of pores between discrete particles. The total porosity of a particulate material may be defined as the sum of the intra-particle and inter-particle porosity.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. More specifically, mercury porosimetry is based on the capillary law governing liquid penetration into small pores. This law, in the case of a non-wetting liquid such as mercury, is expressed by the Washburn equation:

$$D = (1/P) \cdot 4\gamma \cdot \cos\varphi$$

wherein D is pore diameter, P is the applied pressure, $\gamma$ is the surface tension, and $\varphi$ is the contact angle between the liquid and the sample. The volume of mercury penetrating the pores of the sample is measured directly as a function of the applied pressure. As pressure increases during an analysis, pore size is calculated for each pressure point and the corresponding volume of mercury required to fill these pores is measured. These measurements, taken over a range of pressures, give the pore volume versus pore diameter distribution for the sample material. The Washburn equation assumes that all pores are cylindrical. While true cylindrical pores are rarely encountered in real materials, this assumption provides sufficiently useful representation of the pore structure for most materials. For the avoidance of doubt, references herein to pore diameter shall be understood as referring to the equivalent cylindrical dimensions as determined by mercury porosimetry. Values obtained by mercury porosimetry as reported herein are obtained in accordance with ASTM UOP574-11, with the surface tension $\gamma$ taken to be 480 mN/m and the contact angle $\varphi$ taken to be 140° for mercury at room temperature. The density of mercury is taken to be 13.5462 g/cm³ at room temperature.

For a sample in the form of a powder of porous particles, the total pore volume of the sample is the sum of intra-particle and inter-particle pores. This gives rise to an at least bimodal pore diameter distribution curve in a mercury porosimetry analysis, comprising a set of one or more peaks at lower pore sizes relating to the intra-particle pore diameter distribution and set of one or more peaks at larger pore sizes relating to the inter-particle pore diameter distribution. From the pore diameter distribution curve, the lowest point between the two sets of peaks indicates the diameter at which the intra-particle and inter-particle pore volumes can be separated. The pore volume at diameters greater than this is assumed to be the pore volume associated with inter-particle pores. The total pore volume minus the inter-particle pore volume gives the intra-particle pore volume from which the intra-particle porosity can be calculated.

A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

It will be appreciated that mercury porosimetry and other intrusion techniques are effective only to determine the pore volume of pores that are accessible to mercury (or another fluid) from the exterior of the porous particles to be measured. Intra-particle porosity values as specified or reported herein shall be understood as referring to the volume of open pores, i.e. pores that are accessible to a fluid from the exterior of the particles of the invention. Fully enclosed pores which cannot be identified by mercury porosimetry shall not be taken into account herein when specifying or reporting intra-particle porosity values.

The particulate materials of the invention preferably have a BET surface area of less than 100 $m^2/g$, more preferably less than 80 $m^2/g$, more preferably less than 60 $m^2/g$, more preferably less than 40 $m^2/g$, more preferably less than 30 $m^2/g$, more preferably less than 25 $m^2/g$, more preferably less than 20 $m^2/g$, more preferably less than 15 $m^2/g$. The term "BET surface area" as used herein should be taken to refer to the surface area per unit mass calculated from a measurement of the physical adsorption of gas molecules on a solid surface, using the Brunauer-Emmett-Teller theory, in accordance with ASTM B922/10. Since the particulate materials of the invention preferably comprise particles of low intra-particle porosity, the BET surface area will be substantially a function of the particle size and particle size distribution of the composite particles. In general, a low BET surface area is preferred in order to minimise the formation of solid electrolyte interphase (SEI) layers at the surface of the composite particles during the first charge-discharge cycle of an anode comprising the particulate material of the invention. However, a BET surface area which is excessively low results in unacceptably low charging rate and capacity due to the inaccessibility of the bulk of the electroactive material to metal ions in the surrounding electrolyte. For instance, the BET surface area is preferably at least 0.1 $m^2/g$, more preferably at least 1 $m^2/g$, more preferably at least 2 $m^2/g$, more preferably at least 5 $m^2/g$. For instance, the BET surface area may be in the range of from 1 $m^2/g$ to 25 $m^2/g$, more preferably in the range of from 2 to 15 $m^2/g$.

The silicon nanoparticles may be characterised by a Si (111) crystal lattice spacing of at least 10 nm, at least 12 nm, at least 14 nm or at least 16 nm as measured by X-Ray Diffraction (XRD) techniques.

Optionally, the Si (111) crystal lattice spacing of the silicon nanoparticles is no more than 100 nm, no more than 50 nm, or no more than 35 nm.

The particulate material of the invention typically has a specific charge capacity on first lithiation of 1200 to 2340 mAh/g. Preferably the particulate material of the invention has a specific charge capacity on first lithiation of at least 1400 mAh/g.

The particulate material of the invention is preferably obtained by a method as defined with reference to the first aspect of the invention.

It will be understood that the particulate material prepared according to the method of the first aspect of the invention may be further defined by any of the features defined with respect to the particulate material according to the second and third aspects of the invention. Any such features and combinations of features should be understood as applying analogously to the particulate material prepared according to the first aspect of the invention.

In particular, the silicon nanoparticles in the particulate material prepared according to the method of the first aspect of the invention may comprise a nanoparticle core and a nanoparticle surface, wherein the nanoparticle surface comprises a compound of oxygen or a compound of nitrogen or a mixture thereof disposed between the nanoparticle core and the conductive carbon matrix; the particulate material comprises 40 to 65 wt % silicon; the particulate material comprises at least 6 wt % and less than 20 wt % oxygen; the weight ratio of the total amount of oxygen and nitrogen to silicon in the particulate material is in the range of from 0.1 to 0.45; and the weight ratio of carbon to silicon in the particulate material is in the range of from 0.1 to 1.

The silicon nanoparticles in the particulate material prepared according to the method of first aspect of the invention may comprise a nanoparticle core and a nanoparticle surface, wherein a plurality of bridging oxygen atoms and/or a plurality or bridging nitrogen atoms are disposed between the nanoparticle surface and at least a portion of the conductive carbon matrix such that the conductive carbon matrix is chemically bonded to the nanoparticle surface; and the particulate material comprises 40 to 65 wt % silicon; the particulate material comprises at least 6 wt % and less than 20 wt % oxygen; the weight ratio of the total amount of oxygen and nitrogen in the particulate material to silicon in the particulate material is in the range of from 0.1 to 0.45; and the weight ratio of carbon to silicon in the particulate material is in the range of from 0.1 to 1.

In a fourth aspect, the invention provides a particulate material comprising a plurality of composite particles obtainable by the method of the first aspect of the invention.

In a fifth aspect of the invention, there is provided a composition comprising a particulate material according to the second, third or fourth aspect of the invention and at least one other component. In particular, the particulate material of the second, third or fourth aspect of the invention may be used as a component of an electrode composition.

Thus, there is provided an electrode composition comprising a particulate material according to the second, third or fourth aspect of the invention and at least one other component selected from: (i) a binder; (ii) a conductive additive; and (iii) an additional particulate electroactive material. The particulate material used to prepare the electrode composition of the fifth aspect of the invention may have any of the features described as preferred or optional with regard to the second and third aspects of the invention and/or may be prepared by a method including any of the features described as preferred or optional with regard to the first aspect of the invention.

The particulate material of the invention preferably constitutes from 0.5 to 80 wt %, more preferably from 1 to 70 wt %, more preferably from 1 to 60 wt %, more preferably from 2 to 50 wt %, more preferably from 2 to 40 wt %, more preferably from 2 to 30 wt %, more preferably from 5 to 15 wt % of the total dry weight of the electrode composition.

Preferably, the electrode composition is a hybrid electrode composition which comprises a particulate material according to the second, third or fourth aspect of the invention and at least one additional particulate electroactive material. Examples of additional particulate electroactive materials include graphite, hard carbon, silicon, germanium, gallium, aluminium and lead. The at least one additional particulate electroactive material is preferably selected from graphite and hard carbon, and most preferably the at least one additional particulate electroactive material is graphite.

The at least one additional particulate electroactive material preferably has a $D_{50}$ particle diameter in the range of from 10 to 50 μm, preferably from 10 to 40 μm, more preferably from 10 to 30 μm and most preferably from 10 to 25 μm, for example from 15 to 25 μm.

The $D_{10}$ particle diameter of the at least one additional particulate electroactive material is preferably at least 5 μm, more preferably at least 6 μm, more preferably at least 7 μm, more preferably at least 8 μm, more preferably at least 9 μm, and still more preferably at least 10 μm.

The $D_{90}$ particle diameter of the at least one additional particulate electroactive material is preferably no more than 100 μm, more preferably no more than 80 μm, more preferably no more than 60 μm, more preferably no more than 50 μm, and most preferably no more than 40 μm.

In preferred embodiments, the at least one additional particulate electroactive material is selected from carbon-comprising particles, graphite particles and/or hard carbon particles, wherein the graphite and hard carbon particles have a $D_{50}$ particle diameter in the range of from 10 to 50 μm. Still more preferably, the at least one additional particulate electroactive material is selected from graphite particles, wherein the graphite particles have a $D_{50}$ particle diameter in the range of from 10 to 50 μm.

The particulate material of the invention preferably constitutes from 1 to 50 wt % of the total dry weight of the electroactive materials in the electrode composition (i.e. the total dry weight of the particulate material of the invention and the at least one additional particulate electroactive material). More preferably, the particulate material of the invention constitutes from 2 to 40 wt %, more preferably from 4 to 25 wt %, more preferably from 5 to 20 wt % of the total dry weight of the electroactive materials in the electrode composition.

The electrode composition may optionally comprise a binder. A binder functions to adhere the electrode composition to a current collector and to maintain the integrity of the electrode composition. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The electrode composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt % and most preferably 2 to 10 wt %, based on the total dry weight of the electrode composition.

The binder may optionally be present in combination with one or more additives that modify the properties of the binder, such as cross-linking accelerators, coupling agents and/or adhesive accelerators.

The electrode composition may optionally comprise one or more conductive additives. Preferred conductive additives are non-electroactive materials which are included so as to improve electrical conductivity between the electroactive components of the electrode composition and between the electroactive components of the electrode composition and a current collector. The conductive additives may suitably be selected from carbon black, carbon fibers, carbon nanotubes, graphene, acetylene black, ketjen black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt % and most preferably 2 to 10 wt %, based on the total dry weight of the electrode composition.

In an sixth aspect, the invention provides an electrode comprising a particulate material as defined with reference to the second, third or fourth aspect of the invention in electrical contact with a current collector. The particulate material used to prepare the electrode of the sixth aspect of the invention may have any of the features described as preferred or optional with regard to the second and third aspects of the invention and/or may be prepared by a method including any of the features described as preferred or optional with regard to the first aspect of the invention.

As used herein, the term current collector refers to any conductive substrate which is capable of carrying a current to and from the electroactive particles in the electrode composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 μm. The particulate materials of the invention may be applied to one or both surfaces of the current collector to a thickness which is preferably in the range of from 10 μm to 1 mm, for example from 20 to 500 μm, or from 50 to 200 μm.

Preferably, the electrode comprises an electrode composition as defined with reference to the fifth aspect of the invention in electrical contact with a current collector. The electrode composition may have any of the features described as preferred or optional with regard to the fifth aspect of the invention. In particular, it is preferred that the electrode composition used to form the electrode of the sixth aspect of the invention comprises one or more additional particulate electroactive materials as defined above.

The electrode of the sixth aspect of the invention may suitably be fabricated by combining the particulate material of the invention (optionally in the form of the electrode composition of the invention) with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range of from 20 μm to 2 mm, preferably 20 μm to 1 mm, preferably 20 μm to 500 μm, preferably 20 μm to 200 μm, preferably 20 μm to 100 μm, preferably 20 μm to 50 μm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass which may then be bonded to a current collector by known methods.

The electrode of the sixth aspect of the invention may be used as the anode of a metal-ion battery. Thus, in a seventh aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode.

The metal ions are preferably selected from lithium, sodium, potassium, calcium or magnesium. More preferably the rechargeable metal-ion battery of the invention is a lithium-ion battery, and the cathode active material is capable of releasing and lithium ions.

The cathode active material is preferably a metal oxide-based composite. Examples of suitable cathode active materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

In an eighth aspect, the invention provides the use of a particulate material as defined with reference to the second, third or fourth aspect of the invention as an anode active material. Preferably, the particulate material is in the form of an electrode composition as defined with reference to the fifth aspect of the invention, and most preferably the electrode composition comprises one or more additional particulate electroactive materials as defined above.

The elemental analysis of the particulate materials of the invention as reported herein is carried out in accordance with ASTM D5373 using a LECO® TruSpec Micro Elemental Analyzer to determine the wt % of carbon, nitrogen and oxygen in the particulate materials. The analysis of silicon was carried out using ICP-AES analysis in accordance with ASTM D5600.

BRIEF DESCRIPTION OF THE DRAWING

FIG. 1 is a plot of capacity retention (y-axis) vs carbon:silicon ratio (x-axis).

DETAILED DESCRIPTION OF CERTAIN EMBODIMENTS

The invention will now be described by way of examples and the accompanying FIG. 1, which is a plot of capacity retention (y-axis) vs carbon:silicon ratio for Samples 1 to 9 and Comparative Sample 1 as described below.

EXAMPLES

Example 1—Preparation of Particulate Silicon-Carbon Materials

The particulate silicon-carbon materials of samples 1 to 12 and control sample (CS1) were prepared using the silicon raw materials and the carbon sources in the amounts specified in Table 1.

The specified carbon source was dissolved in the specified solvent (approximately 40 mL) in a glass beaker. The particulate raw silicon material was added and the mixture was stirred to form a slurry. The resulting slurry was transferred to a Retsch ball mill cup containing 1 mm zirconium oxide grinding beads. The beaker was rinsed out with additional solvent (2×15 mL) and the washings were added to the Retsch ball mill cup. The lid was placed on the ball mill cup, which was weighed. A second ball mill cup was weighed and its weight was adjusted until it was the same as that of the first ball mill cup; this second cup acts as a counter-balance to the first during planetary ball milling. Both cups were secured to a Retsch PM200 planetary ball mill and the mixture was milled at 500 rpm for 30 minute intervals, rested for 15 minutes, reversing the direction of the mill and repeating these steps until a total active milling time for each sample as set out in Table 1 had been reached.

TABLE 1

| Sample Number | Particulate Raw Silicon | | | Carbon Source | Mass Si/ g | Mass C/ g | Solvent | Active Milling time/mins |
|---|---|---|---|---|---|---|---|---|
| | $D_{50}$ | BET/ $m^2/g$ | Purity | | | | | |
| 1 | 2.5 μm | 6.62 | 99.9% | 2,3-DHN[1] | 5 | 10 | IPA[4] | 180 |
| 2 | 2.5 μm | 6.62 | 99.9% | DAN[2] | 5 | 5 | IPA | 180 |
| 3 | 2.5 μm | 6.62 | 99.9% | 2,3-DHN | 5 | 10 | IPA | 180 |
| 4 | 2.5 μm | 6.62 | 99.9% | 2,3-DHN | 10 | 10 | acetone | 120 |
| 5 | 2.5 μm | 6.62 | 99.9% | 2,3-DHN | 10 | 10 | IPA | 90 |
| 6 | 5.16 μm | 1.99 | 99% | 2,3-DHN | 5 | 10 | IPA | 180 |

TABLE 1-continued

| | Particulate Raw Silicon | | | | | | | Active |
|---|---|---|---|---|---|---|---|---|
| Sample Number | $D_{50}$ | BET/ $m^2/g$ | Purity | Carbon Source | Mass Si/ g | Mass C/ g | Solvent | Milling time/mins |
| 7 | 5.16 μm | 1.99 | 99% | 2,3-DHN | 5 | 5 | Acetone | 120 |
| 8 | 5.16 μm | 1.99 | 99% | 2,3-DHN | 10 | 10 | IPA | 180 |
| 9 | 5.16 μm | 1.99 | 99% | DAB[3] | 5 | 5 | IPA | 180 |
| 10 | 5.16 μm | 1.99 | 99% | Naphthalene | 5 | 5 | IPA | 180 |
| 11 | 5.16 μm | 1.99 | 99% | DAN | 5 | 5 | IPA | 180 |
| 12 | 5.16 μm | 1.99 | 99% | 2,3-DHN | 5 | 5 | IPA | 180 |
| 13 | 6 μm | nd[5] | 98.4% | 2,3-DHN | 5 | 5 | IPA | 180 |
| 14 | 6 μm | nd | 98.4% | 2,3-DHN | 5 | 5 | Acetone | 180 |
| CS1 | 5.16 μm | 1.99 | 99% | — | 5 | 5 | IPA | 180 |

[1] 2,3-dihydronaphthalene;
[2] 2,3-diaminonaphthalene;
[3] 1,2-diaminobenzene;
[4] iso-propyl alcohol;
[5] not determined The milling cups were allowed to cool down. The milled materials were filtered through a 53 μm mesh and washed with additional solvent (about 150 mL) until the filtrate was pale. The solvent was removed from the filtrate under reduced pressure using a Buchi rotary evaporator. The resulting residue was further dried overnight in an oven at 75° C.

The oven-dried material was washed with 5×20 mL portions of acetone to remove any of the unbound carbon source. The acetone washed material was then subject to pyrolysis in an alumina crucible in a furnace using the pyrolysis protocols specified in Table 2. The materials were sealed in the alumina crucible under a flow of argon (1 L/min) and the furnace was programmed to heat to an initial temperature (T1) as specified in Table 2 at a rate of 5° C./minute. The crucible was maintained at this initial temperature for a first hold time (t1) as specified in Table 2 before ramping the temperature at a rate of 5° C./min to a final temperature (T2) as specified in Table 2 and holding the crucible at this temperature for a second hold time (t2) as specified in Table 2 before cooling to room temperature.

The pyrolysed material was removed from the crucible and micronized using a hand held micronizer for periods of 10 seconds up to a total micronization time of between 30 seconds and a minute. The micronized material was then dry milled using a Retsch PM200 planetary ball mill using the conditions specified in Table 2. The material was placed in the ball mill cup in the amount specified in Table 2 together with the required quantity of milling beads, milled at 500 rpm for 2 minutes, rested for 1 minute, changing the direction of the mill and repeating until the total active milling time as specified in Table 2 had been achieved.

TABLE 2

| | Pyrolysis Protocol | | | | Dry Milling Protocol | | | Active |
|---|---|---|---|---|---|---|---|---|
| | | | | | 10 | 13 | | |
| Sample Number | T1/ ° C. | t1/ h | T2/ ° C. | T2/ h | mm beads | mm beads | Sample mass/g | milling time/mins |
| 1 | 300 | 1 | 1000 | 2 | 4 | 4 | 16 | 220 |
| 2 | 150 | 1 | 1000 | 2 | 8 | 8 | 15 | 120 |
| 3 | 300 | 1 | 1000 | 2 | 4 | 4 | 16 | 220 |
| 4 | 300 | 1 | 1000 | 2 | 4 | 4 | 5 | 180 |
| 5 | 300 | 1 | 1000 | 2 | 4 | 4 | 9 | 120 |
| 6 | 300 | 1 | 1000 | 2 | 4 | 4 | 14 | 75 |
| 7 | 300 | 1 | 1000 | 2 | 4 | 4 | 16 | 150 |
| 8 | 300 | 1 | 1000 | 2 | 4 | 4 | 12 | 150 |
| 9 | 150 | 1 | 1000 | 2 | 4 | 4 | 15 | 220 |
| 10 | 150 | 1 | 1000 | 2 | 4 | 4 | 10 | 150 |
| 11 | 300 | 1 | 1000 | 2 | 4 | 4 | 14 | 150 |
| 12 | 300 | 1 | 1000 | 2 | 4 | 4 | 14 | 150 |
| 13 | 300 | 1 | 1000 | 1 | 4 | 4 | 16 | 120 |
| 14 | 300 | 1 | 1000 | 1 | 4 | 4 | 11 | 120 |
| CS1 | 150 | 1 | 1000 | 2 | 4 | 4 | 14 | 120 |

The particulate material was then subjected to particle size analysis using a Malvern Mastersizer 3000 instrument and elemental analysis using both ICP/MS and LECO techniques. The BET surface area value of the resulting particulate material was also determined using a Micromeritics Tristar II 3020 instrument and the results for samples 1 to 12 and comparative sample 1 are presented in Table 3.

TABLE 3

| Sample Number | Elemental Composition (LECO) | | | Elemental Ratio | | Particle Size/μm | | | BET/ $m^2/g$ |
|---|---|---|---|---|---|---|---|---|---|
| | Si % | C % | O % | C/Si | O/Si | $D_{10}$ | $D_{50}$ | $D_{90}$ | |
| 1 | 49.5 | 35.8 | 14.2 | 0.72 | 0.29 | 1 | 5 | 20 | 18 |
| 2 | 49 | 29.1 | 9.2 | 0.59 | 0.19 | 1 | 4 | 22 | 48 |
| 3 | 49.5 | 35.8 | 14.2 | 0.72 | 0.29 | 1 | 5 | 20 | 18 |
| 4 | 63.4 | 25.1 | 11.3 | 0.40 | 0.18 | 1 | 5 | 30 | 28 |
| 5 | 64.1 | 25.2 | 10.5 | 0.39 | 0.16 | 1 | 6 | 22 | 15 |
| 6 | 58.4 | 26.8 | 14.6 | 0.46 | 0.25 | 1 | 5 | 20 | 15 |
| 7 | 52.3 | 33.1 | 14.3 | 0.63 | 0.27 | 1 | 5 | 15 | 20 |
| 8 | 58.4 | 28 | 13.5 | 0.48 | 0.23 | 1 | 6 | 30 | 26 |
| 9 | 65.9 | 18.6 | 10.2 | 0.28 | 0.15 | 1 | 6 | 29 | 28 |
| 10 | 51.5 | 32.7 | 9.7 | 0.63 | 0.19 | 0.89 | 5.39 | 22.6 | 15 |

TABLE 3-continued

| Sample Number | Elemental Composition (LECO) | | | Elemental Ratio | | Particle Size/μm | | | BET/ $m^2/g$ |
|---|---|---|---|---|---|---|---|---|---|
| | Si % | C % | O % | C/Si | O/Si | $D_{10}$ | $D_{50}$ | $D_{90}$ | |
| 11 | 84 | 7.5 | 8.5 | 0.09 | 0.10 | 1 | 9 | 100 | 102 |
| 12 | 83.1 | 6.7 | 10.1 | 0.08 | 0.12 | nd | nd | nd | 134 |
| CS1 | 80.8 | 8.4 | 10.8 | 0.10 | 0.13 | 1.25 | 11.2 | 56.5 | 73 |

Example 2—Preparation of Electrodes

Anodes having the composition specified in Table 4 were prepared from the materials of Examples 1 to 12 and control sample 1 (CS1) using the following method. Test coin cells were made with negative electrodes comprising the silicon-carbon particulate material prepared as described above. A dispersion of Carbon Super P (conductive carbon) and natural graphite ($D_{50}$=2.85 μm) in CMC binder was mixed in a Thinky™ mixer. The silicon carbon particulate material was added to the mixture and mixed for 30 min in the Thinky™ mixer. SBR binder was then added to give a CMC:SBR ratio of 1:1, yielding a slurry with a weight ratio of particulate silicon-carbon:graphite:CMC/SBR:conductive carbon as set out in Table 4. The slurry was further mixed by magnetic stirring for one hour, then was coated onto a 10 μm thick copper substrate (current collector) and dried at 50° C. for 10 minutes, followed by further drying at 120-180° C. for 12 hours to thereby form an electrode comprising an active layer on the copper substrate. The active layer was calendared at 2T prior to cell manufacture.

TABLE 4

| | Anode Composition | | | |
|---|---|---|---|---|
| Sample Number | wt % Si/C product | wt % Graphite | wt % Carbon Super P | wt % binder |
| 1 | 10 | 81 | 5 | 4 |
| 2 | 10 | 81 | 5 | 4 |
| 3 | 15 | 76 | 5 | 4 |
| 4 | 10 | 81 | 5 | 4 |
| 5 | 10 | 81 | 5 | 4 |
| 6 | 10 | 81 | 5 | 4 |
| 7 | 10 | 81 | 5 | 4 |
| 8 | 10 | 81 | 5 | 4 |
| 9 | 10 | 81 | 5 | 4 |
| 10 | 10 | 81 | 5 | 4 |
| 11 | 10 | 81 | 5 | 4 |
| 12 | 10 | 81 | 5 | 4 |
| CS1 | 10 | 81 | 5 | 4 |

Example 3—Cell Manufacture and Cycling

Half Cell Manufacture

Coin half cells were made using circular electrodes of 0.8 cm radius cut from the electrode of example 2 with a porous polyethylene separator, a lithium foil as the counter electrode and an electrolyte comprising 1 M $LiPF_6$ in a 7:3 solution of EC/FEC (ethylene carbonate/fluoroethylene carbonate) containing 3 wt % vinylene carbonate.

These half cells were used to measure the initial volumetric energy density (VED1), first cycle loss (FCL) and first delithiation capacity (DC1) of the active layer. The relevant values are listed in Table 5. The half cells were tested by applying a constant current of C/25, (wherein "C" represents the specific capacity of the electrode in mAh, and "25" refers to 25 hours), to lithiate the electrode comprising the porous particles, with a cut off voltage of 10 mV. When the cut off is reached, a constant voltage of 10 mV is applied with a cut off current of C/100. The cell is then rested for 1 hour in the lithiated state. The electrode is then delithiated at a constant current of C/25 with a cut off voltage of 1V and the cell is then rested for 1 hour. A constant current of C/25 is then applied to lithiate the cell a second time with a 10 mV cut off voltage, followed by a 10 mV constant voltage with a cut off current of C/100.

Full Cell Manufacture

Full coin cells were made using circular negative electrodes of 0.8 cm radius cut from this electrode with a porous polyethylene separator and a lithium cobalt oxide positive electrode. The positive and negative electrodes were designed to form a balanced pair, such that the projected capacity ratio of the electrodes was around 1:1. An electrolyte comprising 1 M $LiPF_6$ in a 7:3 solution of EMC/FEC (ethylene methyl carbonate/fluoroethylene carbonate) containing 3 wt % vinylene carbonate was then added to the cell before sealing.

The full coin cells were cycled as follows: A constant current was applied at a rate of C/25, to lithiate the anode, with a cut off voltage of 4.2 V. When the cut off was reached, a constant voltage of 4.2 V is applied until a cut off current of C/100 is reached. The cell was then rested for 1 hour in the lithiated state. The anode is then delithiated at a constant current of C/25 with a cut off voltage of 3.0 V. The cell was then rested for 1 hour. After this initial cycle, a constant current of C/2 was applied to lithiate the anode with a 4.2 V cut off voltage, followed by a 4.2 V constant voltage with a cut off current of C/40. The anode was then delithiated at a constant current of C/2 with a 3.0 V cut off. The cell was then rested for 5 minutes. This was then repeated for the desired number of cycles. The charge and discharge capacity at 100 cycles (DC100) and the capacity retention (CR100) was determined for each sample; the values are also listed in Table 5.

TABLE 5

| | Cell Cycling Properties | | | | |
|---|---|---|---|---|---|
| Sample Number | VED1 (mAh/g) | FCL (%) | DC1 (mAh/g) | DC100 (mAh/g) | CR100 (%) |
| 1 | 429 | 21.2 | 403 | 322 | 0.80 |
| 2 | 468 | 29.4 | 386 | 302 | 0.78 |
| 3 | 479 | 27 | 406 | 310 | 0.76 |
| 4 | 441 | 23.4 | 432 | 309 | 0.72 |
| 5 | 465 | 24 | 449 | 308 | 0.69 |
| 6 | 303 | 26 | 355 | 284 | 0.80 |
| 7 | 497 | 30 | 312 | 265 | 0.85 |
| 8 | 505 | 24 | 390 | 286 | 0.73 |

TABLE 5-continued

| | Cell Cycling Properties | | | | |
|---|---|---|---|---|---|
| Sample Number | VED1 (mAh/g) | FCL (%) | DC1 (mAh/g) | DC100 (mAh/g) | CR100 (%) |
| 9 | 358 | 26 | 402 | 273 | 0.68 |
| 10 | 481 | 32 | 296 | nd | nd |
| 11 | 416 | nd | nd | nd | nd |
| 12 | 265 | nd | nd | nd | nd |
| CS1 | 360 | 25 | 437 | 265 | 0.61 |

FIG. 1 is a plot of capacity retention (y-axis) vs carbon:silicon ratio. It is observed that good capacity retention is observed when the carbon:silicon ratio is greater than 0.10. At a carbon:silicon ratio of 0.1 or below, the capacity retention is relatively poor. Ideally the carbon to silicon ratio in the particulate material is of the order of 0.4 to 0.65.

Example 4—Preparation of Particulate Silicon-Carbon Material

Isopropyl alcohol (IPA) was transferred into a Netzsch high-energy agitated bead mill containing 200 micron zirconium oxide grinding beads. The bead mill was then set to recirculate the IPA and silicon was slowly added to the solvent to create a silicon slurry of approx. 27% w/w. The slurry was then milled to a $D_{90}$<800 nm while maintaining a slurry temperature less than 50° C. The particle size measurement was performed on a Malvern Mastersizer 3000. The resultant milled slurry was then discharged into a suitable container and the solid content was measured on a loss-on-drying (LOD) moisture analyser (typically 30% w/w). This slurry is referred to as 'pre-milled' silicon slurry.

The 'pre-milled' silicon slurry was then adjusted to 20% w/w solid content with IPA and charged into a Netzsch bead mill containing 50 micron zirconium oxide grinding beads. This slurry was then milled to a $D_{98}$<188 nm while maintaining a slurry temperature less than 50° C. The particle size measurement was performed on a Malvern Mastersizer 3000. The resultant milled slurry was then discharged into a suitable container and the solid content was measured on a LOD moisture analyser (typically 27-30% w/w). This slurry is referred to as 'nano-milled' silicon slurry.

A 20% w/w polyvinylpyrrolidone (PVP) solution in IPA was prepared by dissolving PVP in IPA using an overhead stirrer. This was then measured for solid content using a LOD moisture analyser. This PVP solution was then combined with the 'nano-milled' silicon slurry at a solid weight ratio of 1 part silicon and 1.1 part PVP and mixed with an overhead stirrer until fully homogenized in a high pressure homogenizer. This homogenized Si:PVP slurry was then passed through a high pressure homogenizer under a pressure of approx. 1500 bar and collected in a suitable container. The solid content was then measured on a LOD moisture analyser (Sartorius MA37 at 100° C.) and adjusted to 20% w/w total solid content with IPA prior to spray drying.

Spray drying was performed on a ProCept 4M8Trix dryer with a Nitrogen closed loop. The homogenised Si/PVP/IPA slurry (410 g) was fed to the spray dryer at a rate of 10 g/min. The dried product was collected from the cyclone (71.2 g, 87% recovery) and found to have a $D_{50}$=10.5 μm (Malvern Mastersizer/Aero) and a volatiles content of 7 wt %.

Further dried product was recovered from the drying chamber walls (10.9 g) but not combined with material from the cyclone.

The spray dried material (20 g batch size) was then charged into a 400 mL glass rotary furnace vessel and placed into a Carbolite HTR1100 rotary furnace. The material was then placed under a 0.2 ml/min flow of dry compressed air and rotated at approx. 0.75 rpm. This air flow and rotation was maintained throughout the process. The furnace was heated under controlled conditions to a maximum temperature of 270° C. at a rate of temperature increase of no more than 5° C./min and then held at this temperature for 4 hours in order to cross-link the PVP and the silicon. After cross-linking the material was left for approx. 2 hours to cool prior to discharging from the vessel. At this stage a ~2 g sample was removed and the material composition was analysed using both ICP/MS and LECO techniques.

The cross-linked material was then placed in an alumina crucible and pyrolysed in a static Carbolite tube furnace under a flow nitrogen (0.6 L/min). The furnace was heated to 1170° C. at a rate of 5° C./min and then held at this temperature for 3 hours before cooling naturally (typically 10-15 hours).

The pyrolysed product is then sieved via a 38 micron mesh prior to use. The material is also fully characterized with respect to elemental composition (as per above) and surface area (BET), particle size and tap density. The BET is measured using a Micromeritics Tristar II 3020 instrument. The properties of the final product are provided below in Table 6.

Example 5—Preparation of Particulate Silicon-Carbon Material without Temperature Control Example 5 was carried out in the manner described for Example 4, except that the cross-linking reaction was carried out in a static furnace and without controlling the maximum temperature of the cross-linking reaction. Due to the exothermic cross-linking reaction the internal temperature increased rapidly from 100° C. to well over 300° C. The properties of the final product are provided below in Table 6.

Example 6—Preparation of Carbon Coated Silicon-Carbon Composite Material Via CVD 11.1 g of a silicon-carbon composite material prepared according to the method of Example 5 was charged to a tared quartz reaction vessel (400 ml/85 mm diam.) and heated to 900° C. under Argon (200 mL/min) in a Carbolite HTR1100 rotary furnace at 5° C./min. Oscillation was set at approx. 1/min. When the furnace had reached the target temperature, ethylene gas was admitted (20 mL/min) for 20 mins. The ethylene flow was then stopped and argon was allowed to flow for a further 5 mins, after which time the heating was stopped. The product was allowed to cool passively under argon while rotating until the internal temperature had dropped to 50° C. The reaction vessel was weighed and an approximate weight increase of 0.3 g (2.6%) was recorded. The product was collected (10.6 g) and the BET was found to have reduced from 5.0 to 3.4 m²/g. The properties of the final product are provided below in Table 6.

TABLE 6

| | | Example 4 | Comparative Example 5 | Example 6 |
|---|---|---|---|---|
| Surface | Carbon | 89.7% | 86% | 96.6% |

TABLE 6-continued

|  |  | Example 4 | Comparative Example 5 | Example 6 |
|---|---|---|---|---|
| Characterisation via XPS | Silicon | 3.5% | 4.63% | 1.22% |
|  | Silicon Oxides | 1.6% | 3.74% | 0.82% |
|  | Oxygen | 4.6% | 8.0% | 1.8% |
| Bulk | Oxygen | 15.38 | 16.4 | 16.4 |
|  | Carbon | 19.21 | 21.24 | 21.24 |
|  | Silicon | 56.22 | 55.09 | 55.09 |
| Half cell First Cycle Loss | % | 21.9 | 24.5 | 23.9 |
| Half Cell Delithiation Capacity | mAh/g | 1647 | 1719 | 1691 |

The invention claimed is:

1. Composite particles comprising silicon nanoparticles dispersed within a conductive carbon matrix, wherein the composite particles:
   (i) have a $D_{50}$ particle diameter of no more than 25 µm,
   (ii) have a particle size distribution span $((D_{90}-D_{10})/D_{50})$ of 5 or less,
   (iii) have a weight ratio of a total amount of oxygen and nitrogen to silicon of no more than 0.42,
   (iv) have a weight ratio of carbon to silicon of at least 0.2,
   (v) comprise less than 18 wt % oxygen, and
   (vi) comprise pores having a diameter of less than 2 nm distributed throughout their volume.

2. The composite particles according to claim 1, wherein the silicon nanoparticles comprise a nanoparticle core and a nanoparticle surface, wherein the nanoparticle surface comprises a compound of oxygen or a compound of nitrogen or a mixture thereof.

3. The composite particles according to claim 1, wherein the composite particles comprise 40 to 65 wt % silicon.

4. The composite particles according to claim 1, wherein the composite particles have a $D_{99}$ particle diameter of no more than 50 µm.

5. The composite particles according to claim 1, wherein the silicon nanoparticles have a $D_{50}$ particle diameter of no more than 120 nm.

6. The composite particles according to claim 1, wherein the surface of the silicon nanoparticles comprises silicon oxide.

7. The composite particles according to claim 1, wherein the composite particles have an intra-particle porosity of no more than 30%, as determined by mercury porosimetry.

8. The composite particles according to claim 1, wherein the composite particles have a BET surface area of no more than 100 $m^2/g$.

9. The composite particles according to claim 1, wherein the composite particles have a BET surface area of no more than 30 $m^2/g$.

10. The composite particles according to claim 9, wherein the composite particles comprise a carbon coating.

11. The composite particles according to claim 1, wherein the composite particles have a specific charge capacity on first lithiation of at least 1200 mAh/g.

12. The composite particles according to claim 1, comprising from 0.1 to 8 wt % of one or more elements selected from aluminum, iron, copper, gallium, magnesium, calcium, titanium and zirconium with balance of the material being silicon, carbon, nitrogen, and oxygen.

13. The composite particles according to claim 1, wherein the particulate material comprises at least 80 wt % in total of silicon, carbon, oxygen and nitrogen.

14. The composite particles according to claim 13, wherein the composite particles comprise at least 98 wt % in total of silicon, carbon, oxygen, and nitrogen.

15. The composite particles according to claim 1, wherein the conductive carbon matrix has an amorphous structure with graphite-like character.

16. The composite particles according to claim 1, wherein the conductive carbon matrix has been obtained by pyrolysis of a pyrolytic carbon precursor.

17. The composite particles according to claim 1, comprising cross-links between the silicon nanoparticles and the conductive carbon matrix.

18. The composite particles according to claim 1, wherein the composite particles comprise a carbon coating.

19. The composite particles according to claim 18, wherein the carbon coating has been obtained by a chemical vapor deposition (CVD) method.

20. The composite particles according to claim 1, wherein the composite particles have been subjected to a size reduction step.

21. The composite particles according to claim 20, wherein the size reduction step comprises ball milling, planetary milling, jet milling or a combination thereof.

22. The composite particles according to claim 20, wherein the composite particles comprise a carbon coating.

23. An electrode comprising an electrode composition forming a layer on a current collector, the electrode composition comprising the composite particles according to claim 1 and at least one other component selected from: (i) a binder; (ii) a conductive additive; and (iii) an additional particulate electroactive material.

24. The electrode according to claim 23, wherein the composite particles constitute from 0.5 to 80 wt % of total dry weight of the electrode composition.

25. A rechargeable metal-ion battery comprising an anode, wherein the anode comprises the composite particles according to claim 1.

* * * * *